United States Patent
Horst

(10) Patent No.: US 12,160,531 B2
(45) Date of Patent: Dec. 3, 2024

(54) METHOD OF BINDING A DIGITAL REPRESENTATION OF AN ACTUAL EVENT WITH THE REAL TIME OF ITS OCCURRENCE

(71) Applicant: Nikodem Horst, Poznan (PL)

(72) Inventor: Nikodem Horst, Poznan (PL)

(*) Notice: Subject to any disclaimer, the term of this patent is extended or adjusted under 35 U.S.C. 154(b) by 58 days.

(21) Appl. No.: 17/613,360

(22) PCT Filed: May 23, 2020

(86) PCT No.: PCT/PL2020/050041
§ 371 (c)(1),
(2) Date: Nov. 22, 2021

(87) PCT Pub. No.: WO2020/236020
PCT Pub. Date: Nov. 26, 2020

(65) Prior Publication Data
US 2022/0231868 A1    Jul. 21, 2022

(30) Foreign Application Priority Data
May 23, 2019  (PL) .......................................... 430028

(51) Int. Cl.
*G06F 16/00* (2019.01)
*G06F 16/23* (2019.01)
(Continued)

(52) U.S. Cl.
CPC ............ *H04L 9/50* (2022.05); *G06F 16/2365* (2019.01); *G06F 21/645* (2013.01); *H04L 9/3297* (2013.01)

(58) Field of Classification Search
CPC .................................................. G06F 16/2365
See application file for complete search history.

(56) References Cited

U.S. PATENT DOCUMENTS 10,313,360 B2   6/2019 Wilson
11,574,037 B1*  2/2023 Larimer ................ G06F 16/182
(Continued)

FOREIGN PATENT DOCUMENTS

CN   109327311 A   2/2019
CN   109543065 A   3/2019
(Continued)

OTHER PUBLICATIONS

Anonymous, "Authenticity Verification of User Generated Video Files" <prover.io/assets/White_Paper_en.pdf> (Jul. 2018).
(Continued)

*Primary Examiner* — Khanh B Pham
(74) *Attorney, Agent, or Firm* — FISHERBROYLES, LLP; Ronni S. Jillions

(57) ABSTRACT

The invention relates to a method of binding a digital representation of an actual event with the real time of the occurrence of the actual event. The method comprises acquiring a source event data S-ED of an actual source event SE, and sending a representation of the source data ED to an immutable database (203) for storing and real-time timestamping, calculating a hash code HC using hash functions having on the input at least: a data describing state of the immutable database (203), the source data S-D and the timestamp of the source data S-D, converting the hash code HC to a representation of a hash code HC and storing the method used to perform the conversion, presenting a representation of the hash code HC in real time so to incorporate said representation into the realm of the source event SE, in order to create a confirmation event CE, the confirmation event CE being a source event SE with physically present representation of the hash code HC and acquiring a confirmation event data C-ED of the confirmation event CE and sending a representation of the confirmation data C-D to the (Continued)

immutable database (203) for storing and instant timestamping.

29 Claims, 6 Drawing Sheets

(51) Int. Cl.
*G06F 21/64* (2013.01)
*H04L 9/00* (2022.01)
*H04L 9/32* (2006.01)

(56) References Cited

U.S. PATENT DOCUMENTS

| | | | |
|---|---|---|---|
| 2006/0117182 | A1 | 6/2006 | Wolff |
| 2019/0044727 | A1* | 2/2019 | Scott ............... H04L 9/3239 |
| 2019/0130190 | A1 | 5/2019 | Raspotnik, Jr. |
| 2019/0158274 | A1* | 5/2019 | Tormasov ......... H04L 9/3297 |
| 2020/0201978 | A1* | 6/2020 | Dewost ............. G06F 21/32 |
| 2020/0372184 | A1* | 11/2020 | Meirosu ........... G06Q 20/02 |
| 2021/0263907 | A1* | 8/2021 | Krueger ............ H04L 9/3297 |

FOREIGN PATENT DOCUMENTS

| | | |
|---|---|---|
| JP | 2006343790 A | 12/2006 |
| JP | 2007006122 A | 1/2007 |
| JP | 2013077188 A | 4/2013 |
| JP | 2017098806 A | 6/2017 |
| JP | 2017182433 A | 10/2017 |
| KR | 20130126815 A | 11/2013 |
| RU | 2409861 C2 | 1/2011 |
| RU | 2419136 C1 | 5/2011 |
| RU | 124962 U1 | 2/2013 |
| RU | 2679205 C1 | 2/2019 |
| RU | 2680033 C2 | 2/2019 |

OTHER PUBLICATIONS

Gipp et al., "Securing Video Integrity Using Decentralized Trusted Timestamping on the Bitcoin Blockchain", Proceedings of the 10th Mediterranean Conference on Information Systems (MCIS) Tenth Mediterranean Conference on Information Systems (Sep. 2016), <www.gipp.com/wp-content/papercite-data/pdf/gipp2016a.pdf>.
Hepp et al., "On-chain vs. off-chain storage for supply- and blockchain integration", Information Technology (Nov. 2018); vol. 60 (No. 5-6) pp. 283-291.

* cited by examiner

METHOD OF BINDING A DIGITAL REPRESENTATION OF AN ACTUAL EVENT WITH THE REAL TIME OF ITS OCCURRENCE

FIELD OF INVENTION

The present invention provides a method of binding a digital representation of an actual event (such as, for example, a digital photo or a video) with the real time of its occurrence. The method is human trust-free and unquestionable. In particular the present invention relates to a method of generating a digital representation of an actual event bound with the real time of the occurrence of said actual event and a device and a computer program product associated with said method. Further the present invention relates to a method of confirming time certification of the digital representation of an actual event bound with the real time of the occurrence of said actual event and a device and a computer program product associated with said method.

The present invention finds its application in any situation when reliable proof of any actual event with or without its real-timestamp is required. It can be used for example to generate a proof of occurrence of an actual event to be used in court proceedings or to verify whether some event depicted in the photo shared for example in social media has really happened at a particular time.

Another examples include, but are not limited to confirmation of a person being in a specific place at a specific time, confirmation of accomplishing a task, confirmation of a real condition of any object such as, for example, a car, a yacht, a building, at a specific time, for example, for the insurance and rental purposes.

STATE OF THE ART

It is known in the art that an actual event may be captured by a digital device, that is capable of recording digital representation of this event. The term an actual event AE as used in the description means any event or any situation, existing in the reality or as a matter of fact, that can be perceived by human senses or artificial intelligence (as opposed to, for example, purely abstract or virtual events such as computations). A digital representation of an actual event, hereinafter is referred to as event data. Event data can be acquired either in a single mode (for example, as a photo) or in a continuous mode (for example, as a video or sound recording). Event data are commonly used to confirm the occurrence of actual events depicted therein, however both the content of the event data, as well as the time of its capture can be questioned. In result the event data are not sufficient to provide reliable proof of occurrence of an actual event nor to indicate the real time of its occurrence. For a time reliable confirmation of an actual event, as well as to determine if the event occurred, a trust provided by a third-party (e.g. a human witness or some authority) is required, usually in a form of written confirmation, verbal confirmation, or both.

In theory, at least three things are required to obtain an unquestionable proof that some event did happen at a particular time: 1) a reliable event data, 2) a reliable timestamp and 3) some link between them to bind one to the other. Although there is little recognition of this problem, it is worth noting that these very requirements apply to all event data that are used as evidence in court proceedings.

Reliable Event Data

Acquisition of event data in general is relatively simple thanks to digital devices, such as smartphone cameras. However, event data can be modified or even created. As a result, there is no certainty, that event data have not been tampered with.

Reliable Timestamp

Reliable timestamp is easy to acquire from many sources because reliable timestamping is required for all network operations, including bank transactions and network servers-related issues (such as data synchronization). However, event data may have a timestamp from a source that is extremely untrusted, such as internal clock of the device used to capture the event data.

Link Between Reliable Event Data and Reliable Timestamp

Establishing a link between the timestamp and the event data is very important for the purposes of confirming that the actual event took place in a certain time.

In general this link should be ensured by timestamping. All timestamping methods are similar: after collecting the data to be timestamped, a timestamp is acquired from some source and attached to the data. This process does not ensure genuity of timestamped data nor any information about real time of their creation.

In the simplest solutions, that do not require any involvement of third-parties, a timestamp is generated and attached locally, for example by a device acquiring the event data (e.g. a smartphone). This solution cannot be considered reliable because the data, both event data as well as timestamp data can be modified.

In the most complex solutions, a trusted third-party (such as a trusted timestamping authority) stores a full or abbreviated record of the timestamped data, however even in this case nothing is known about the creation time and genuity of the data.

As demonstrated above, all known solutions that bind event data with a timestamp require human trust. Trust is commonly used to recognize something as credible or not, in situations that cannot be proven in a mathematical or logical way. The main disadvantage of human trust is that it depends on the human intentional or unintentional action and it cannot be related to any mathematical or logical proof. Therefore it does not provide absolute certainty about the subject matter that is to be trusted.

In case if event data is used as an evidence of an actual event, so far there is no direct, reliable method of determining the genuity of event data and real time of occurrence of the actual event depicted therein. Therefore an indirect way for determining the approximated time of occurrence of the event is used, such as, for example, a testimony of an eye-witness. This process is human-dependent: it depends on, among others, the perception skills, the memory, and the willingness of the witness. The witness may be intentionally or unintentionally wrong, or may not remember all information that is necessary to confirm both the event itself and the time the event occurred. Another shortcoming of a human witness-based confirmation of both the time of the event occurrence and the event itself, is that the reliability of a single witness may be variously perceived by different persons or entities. In complex court cases, multiple human witnesses are preferred or even required, rather than just one witness.

To address the need for trust in the authentication of data/documents and the time of their creation, there exists a widely recognized concept of trusted third parties (such as timestamping authorities) whose role is to provide unquestionable trust. Apart from the fact that this solution only transfers the "trust" to someone that is considered reliable, the trusted third parties do provide only information about the precise time of uploading the data that previously existed, without providing the time of the data creation and without guaranteeing the genuity of timestamped data. Such exemplary known timestamping methods are given below.

American patent application US20060117182 discloses a document authentication system and method combining digital and non-electronic (or visual) authentication methodologies in an integrated, unified manner. As well as providing indicia of digital authentication, the invention generates a physical artifact that can be validated by unaided human visual perception. However, because the purpose of this invention was tamper-proof authentication of the documents, it only attaches some data to an already uploaded (scanned) document and at most it allows only to confirm the exact time of their upload.

American patent publication U.S. Ser. No. 10/313,360, relates to tampering detection using cryptography and also to timestamping and establishment of an asserted date for a document. The description of the invention discloses a computer implemented method of using a blockchain to generate evidence for later proving the integrity of a document, the method executable by a processor. A trusted timestamping authority (TTSA) may be used, but even if the TTSA loses credibility or a challenger refuses to acknowledge the validity of a timestamp, a date for an electronic document may still be established. The described method however does not provide a reliable information about the creation time of a processed document, nor about its genuity.

It is also known in the art a trusted timestamping system, which uses a TTSA, in which the document author's computing resources exchange information with the TTSA. A document is created and hashed with a hash function to produce a document hash value, which is communicated to the TTSA. Upon receiving the document hash value, the TTSA generates a timestamp, appends it to the document hash value, and hashes the combination with a hash function to produce a timing hash value. Hash functions may be identical, but this is not required. Timing hash values encrypted with public key encryption module uses the private key of the TTSA to produce the encrypted hash value. The encrypted hash value and timestamp are communicated back to the author's computing resources to be combined with the document in a document record. The document is thus timestamped and ready to be date proven at a later time. It is important to note that timestamp does not establish the time when the document was created, but only establishes when the document's hash value was received by the TTSA. That is, if the document is many years old upon initiation of the timestamping process, the timestamp will not reflect the actual earlier creation date, but rather only the later date when document hash value was received by the TTSA. That is why the discussed known system allows only to authenticate documents (yet without any reference to their genuity) and does allow only to determine a precise time of their upload, not the creation time.

There is also a method, disclosed in the Korean patent application KR20330126815, for preventing forgery and securing probative evidence of multimedia data, by transmitting context information, such as the hash value, the date of creation, the location of creation (by GPS), the tilt of a creating device (by gyroscope) and the identification of the creating device. This context information is generated when the multimedia such as a photograph or the like is created, through an external device such as a smartphone, a smart pad or the like, and sent to a timestamp service agency, which is a trusted third party, through a network, and receiving an issued time stamp including a hash value of the context information.

However, also in this solution there is no certainty that uploaded multimedia file depicts some event that just occurred. The timestamp is only attached to the uploaded data and it should be regarded as most as an additional description of the uploaded file, but obviously not as the real-time timestamp of the event occurrence.

Because a reliable, good quality event data and a reliable timestamp can be acquired relatively easy, it is the link between them that is still a challenge.

To summarize, if the data to be processed by contemporary trusted timestamping methods are event data (i.e. they are depicting some actual event), there is no possibility of determining the real time of the occurrence of the depicted event, nor the genuity of these event data. In all known solutions, the trust is needed to determine the time of the occurrence of the depicted event and to confirm the depicted content. The contemporary trusted timestamping methods guarantee only one thing: that the timestamped data existed prior to a precise moment in time—the very moment of generating the timestamp. In particular there is no certainty that prior to the timestamping process the data itself was not tampered with or even created as a false proof of something that had never occurred.

The weak point of known solutions is that the binding of an event data to a real-time timestamp requires the human trust. This is because there is no unquestionable method of binding a reliable event data with a reliable real-time timestamp acquired in the moment of the "event data" acquisition.

THE PROBLEM TO BE SOLVED

Thus an object of the invention is to provide unquestionable method of determining the exact time of the occurrence of an actual event recorded as an event data and, as well as, to provide the genuity of this event data (so to know that this actual event really occurred) without referring to the human trust.

SUMMARY OF THE INVENTION

According to a first aspect of the invention, a method of generating a digital representation of an actual event bound with the real time of the occurrence of said actual event is provided. Said method comprises acquiring a source event data S-ED of an actual source event SE that is to be digitally documented, sending a source data S-D, being a representation of the source event data S-ED, to an immutable database for registration and timestamping, receiving in real time a representation of a hash code HC calculated using a hash function having on its input at least: the source data S-D, a timestamp of the source data S-D, and the data describing the state of said immutable database. The method further comprises physical presenting said representation of the hash code HC for sensual perception to enable incorporation of said representation of the hash code HC into the realm of the source event SE so as to create a confirmation event CE, further acquiring a confirmation event data C-ED of the confirmation event CE, and sending the confirmation data C-D, being a representation of the confirmation event data C-ED, to the immutable database for registration and timestamping.

Advantageously, the source data S-D, is a fingerprint of the source event data S-ED and/or the confirmation data C-D is a fingerprint of the confirmation event data C-ED. In such a case the source event data S-ED and/or the confirmation event data C-ED must be stored in the immutable database or elsewhere, for example locally by the creator, preferably in a system for generating a digital representation of an actual event bound with the real time of the occurrence of said actual event.

Advantageously, data significantly characterizing the input data of the hash function that calculates said fingerprint is send for storage together with the source data S-D and/or the confirmation data C-D to the immutable database.

According to a second aspect of the invention a system for generating a digital representation of an actual event bound with the real time of the occurrence of said actual event is provided. It comprises digital registration means configured to acquire a source event data S-ED of an actual source event SE that is to be digitally documented, communication means configured to send a source data S-D, being a representation of the source event data S-ED, to an immutable database for registration and timestamping, and configured to receive in real time the representation of a hash code HC calculated using a hash function having on its input at least: the source data S-D, a timestamp of the source data S-D, and the data describing the state of said immutable database. Said system further comprises presentation means for physical presenting said representation of the hash code HC for sensual perception to enable incorporation of said representation of the hash code HC into the realm of the source event SE so as to create a confirmation event CE, wherein the digital registration means are further configured to acquire a confirmation event data C-ED of the confirmation event CE, wherein the communication means are further configured to send the confirmation data C-D to the immutable database for their registration and timestamping, the confirmation data C-D being the representation of the confirmation event data C-ED.

According to a third aspect of the invention a computer program product is provided. The computer program product comprises instructions which, when executed by a computer, causes the computer to perform the method of generating a digital representation of an actual event bound with the real time of the occurrence of said actual event according to the invention.

According to a fourth aspect of the invention a method of providing time certification of the digital representation of an actual event bound with the real time of the occurrence of said actual event is provided. It comprises receiving a source data S-D being the representation of a source event data S-ED of an actual source event SE that is to be digitally documented, storing the source data S-D in an immutable database, timestamping in real time the source data S-D with a timestamp acquired from a trusted source, storing the timestamp in the immutable database, determining the state of the immutable database at a particular time indicated by said timestamp, calculating a hash code HC using a hash function having on its input at least: the source data S-D, the timestamp of the source data S-D, and the data describing the state of said immutable database, sending in real time a representation of the hash code HC for incorporation into the realm of the actual source event SE, receiving a confirmation data C-D being a representation of a confirmation event data C-ED of a confirmation event CE, the confirmation event CE being the source event SE comprising additionally physically incorporated representation of the hash code HC into its realm, storing the confirmation data C-D into the immutable database, timestamping in real time the confirmation data C-D with a timestamp acquired from a trusted source, and storing the timestamp of the confirmation data C-D in the immutable database.

Yet according to another aspect of the invention it is provided a computer program product comprising instructions which, when executed by a computer, causes the computer to perform the method of providing time certification of the digital representation of an actual event bound with the real time of the occurrence of said actual event according to the invention.

Yet according to another aspect of the invention a system for providing time certification of the digital representation of an actual event bound with the real time of the occurrence of said actual event is provided. Said system comprises at least one memory comprising an immutable database, at least one processor and communication means, said communication means being configured to receive and store a source data S-D being a representation of a source event data S-ED of an actual source event SE that is to be digitally documented, said immutable data base being configured to perform real time timestamping of the source data S-D with the timestamp acquired from a trusted source and further configured to store said source data S-D and the timestamp of the source data S-D, said at least one processor being configured to determine data describing the state of said immutable database at a particular time indicated by the timestamp acquired when timestamping the source data S-D, and configured to calculate a hash code HC using a hash function having on its input at least: the data describing the state of the immutable database, the source data S-D, and the timestamp of the source data S-D, the communication means being further configured to send a representation of the hash code HC and to receive a confirmation data C-D, being a representation of the confirmation event data C-ED of a confirmation event CE, the confirmation event CE being the source event SE comprising additionally physically incorporated representation of the hash code HC into its realm, said immutable database being further configured to receive and store said confirmation data C-D and to perform real time timestamping of the confirmation data C-D with the timestamp acquired from a trusted time source.

Advantageously, the immutable database is a blockchain.

According to another aspect of the invention a method is provided for binding the event data of an actual event with real-time timestamp of their acquisition, without referring to human trust, and in such a way that the genuity of event data (i.e. occurrence of the actual event) cannot be questioned. Said method comprises following steps: acquiring a source event data S-ED of an actual source event SE, and sending a source data S-D, being a representation of the source event data S-ED to an immutable database for storing and real-time timestamping, calculating a hash code HC using hash functions having on the input at least: a data describing state of the immutable database, the source data S-D and the timestamp of the source data S-D, converting the hash code HC to a representation of a hash code HC and storing the method used to perform the conversion, displaying a representation of the hash code HC in real time so to incorporate said representation into the realm of the source event SE, in order to create a confirmation event CE, the confirmation event CE being a source event SE with physically present in its realm representation of the hash code HC, acquiring a confirmation event data C-ED of the confirmation event CE and sending a confirmation data C-D being a representation of the confirmation event data C-ED to the immutable database for storing and instant timestamping.

The method according to the invention binds an event data with the actual time of the occurrence of the actual event depicted therein. It creates the irrefutable proof that the event depicted in the event data happened in the exact time, and that the event data are genuine (were not tampered with). According to the invention the method gives such reliability of a created proof that allows using it for example, in court proceedings.

By using an immutable database and instant timestamping of actual event data and by incorporating in real time a representation of the hash code HC into the realm of the actual event, both genuity of event data as well as real time of the data creation is provided. Because the method is based purely on mathematics, it is unquestionable.

Said immutable database is a data structure that replaces any human witness or authority (trusted authorities, notaries, eyewitnesses etc).

Thanks to the database being immutable-by-design (for example, a blockchain), there is no possibility to change the data already stored in it. In addition, if the immutable database is a blockchain (or if said database uses a similar technology), the indestructibility of its data is provided by the design. The immutable database is capable of generating a data determining its state, for example, by calculating a number that uniquely characterizes its already stored data, for example, a fingerprint of its all already stored data.

The link between the event data and the timestamp is established and confirmed only by the immutable database and the system for generating a digital representation of an actual event bound with the real time of the occurrence of said actual event, used by the creator. In consequence, except for the system used by the creator, no one else, for example, no human witness, is required.

The link between the event data and the real-time timestamp is obtained thanks to the acquisition of event data of some actual event. The event data are acquired twice: before and after incorporation of the representation of the hash code HC into the realm of the actual event. Both event data are stored in the immutable database.

Thanks to the event data depicting the same actual event before and after the incorporation of the representation of the hash code HC, there is no doubt, that the representation of hash code HC was incorporated into the realm of actual event. The presence of the representation of a hash code HC in the realm of actual event is a proof that the creator knew this representation of the hash code HC at least in the moment of its incorporation.

The unquestionable bond between the actual event depicted in the event data and the real time of the occurrence of the actual event is obtained thanks to the fact that the source event data S-ED and the confirmation event data C-ED are depicting the same actual event, with the only difference being that the confirmation event data C-ED in its realm contains an incorporated representation of the hash code HC, that was generated by an immutable database using on input, at least the source data S-D, the timestamp of the source data S-D and data describing state of said immutable database. That is why there is no doubt, that the creator knew this unique hash code HC and therefore was able to create a confirmation event CE, by incorporating the representation of the hash code HC into realm of the source event SE.

Thanks to using cryptographic hash functions when calculating the hash code, the hash code itself is unquestionable proof of simultaneous existence of all input values that were used to calculate it.

Moreover, thanks to choosing the type of hash function input data which are at least: the representation of event data (before incorporation of the hash code), the real-time timestamp of said representation of the event data, and the state of the immutable database, an unquestionable link with the real time of the occurrence of the actual event being documented is guaranteed. These three input values are significant and required to prove the simultaneous existence of three different datasets:
- the event data ED that depicts some actual event AE before incorporation of the representation of the hash code HC
- a timestamp of the event data—acquired from trusted source
- state of the immutable database in a particular moment of time determined by said timestamp Thanks to this design of the described invention, the representation of the hash code that is incorporated into the realm of the actual event, is sufficient to prove that actual event depicted in the event data took place in particular time and that event data were not tampered with. Thanks to the using of hash functions to calculate the hash code HC, resulting credibility level of the invention is the same as commonly used functions for the purpose of network operations such as logging, financial transactions, etc.

In case of event data acquired in a single mode (as a photo), thanks to registering twice the same scene, namely with and without a representation of the hash code HC, the proof of occurrence of the event is obtained. It results from the fact, that the second registration of this event contains physically recognizable representation of the hash code HC in its physical context. The achievable accuracy of the method when acquiring event data in single mode is 'real-time' understood as seconds.

In case of event data acquired in a continuous mode (as videos or sound recordings), thanks to their continuity, the incorporation of a representation of the hash code HC is performed in real time. The achievable accuracy of the method when acquiring event data in continuous mode is 'real-time' understood as milliseconds.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE EMBODIMENTS

Figure 1:
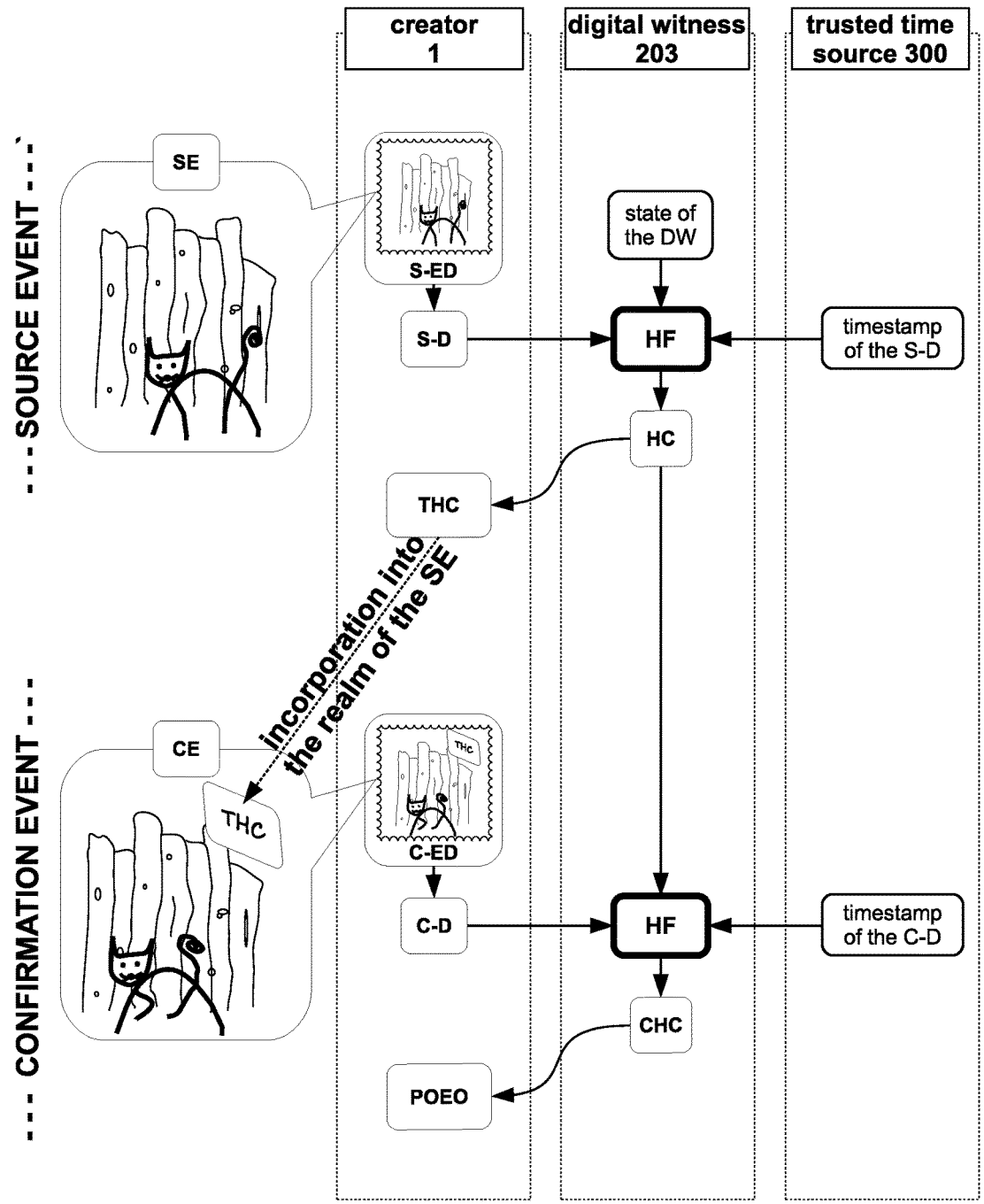
FIG. 1 is a diagram depicting a method of binding a digital representation of an actual event with the real time of its occurrence, according to the present invention.

The present technology is commonly used to capture actual events in a digital form as event data (photos, video recordings, etc.). As mentioned earlier, for all practical purposes these event data, properly presented, are subjects for human sensual inspection—at least by vision [sight] and/or hearing (e.g. actual events depicted in photos, video recordings or sound recordings). Currently among different types of senses used by human for perception of an event only the hearing and the sight are possible to be registered digitally and then read by sensual inspection of human, however the invention is not limited in this regards in the future.

The term an actual event AE as used in the description means any event or any situation, existing in the reality or as a matter of fact, that can be perceived by human senses or artificial intelligence (as opposed to, for example, purely abstract or virtual events such as computations). Moreover event data ED means a digital record of an actual event AE. Event data ED may be acquired in two ways: in a single mode—in this case the event data ED is, for example, a photo, or in a continuous mode—in this case the event data ED is, for example, a video recording or a sound recording.

The method of binding a digital representation of an actual event with the real time of the occurrence of the actual event will be now described in reference to FIG. 1-FIG. 5. The method according to the invention comprises several steps performed in a spread manner, namely by a system 100 used locally or remotely by a creator 1 as well as by a remote system 200 owned by a third party 2, said remote system 200 comprising an immutable database 203 (digital witness DW 203) and communicating with a trusted time source 300. Here the term creator 1 means one or more human or one or more entity, including artificial intelligence or similar algorithm(s), acting in order to create a bond between an actual event being documented and a real-time timestamp.

Figure 3:
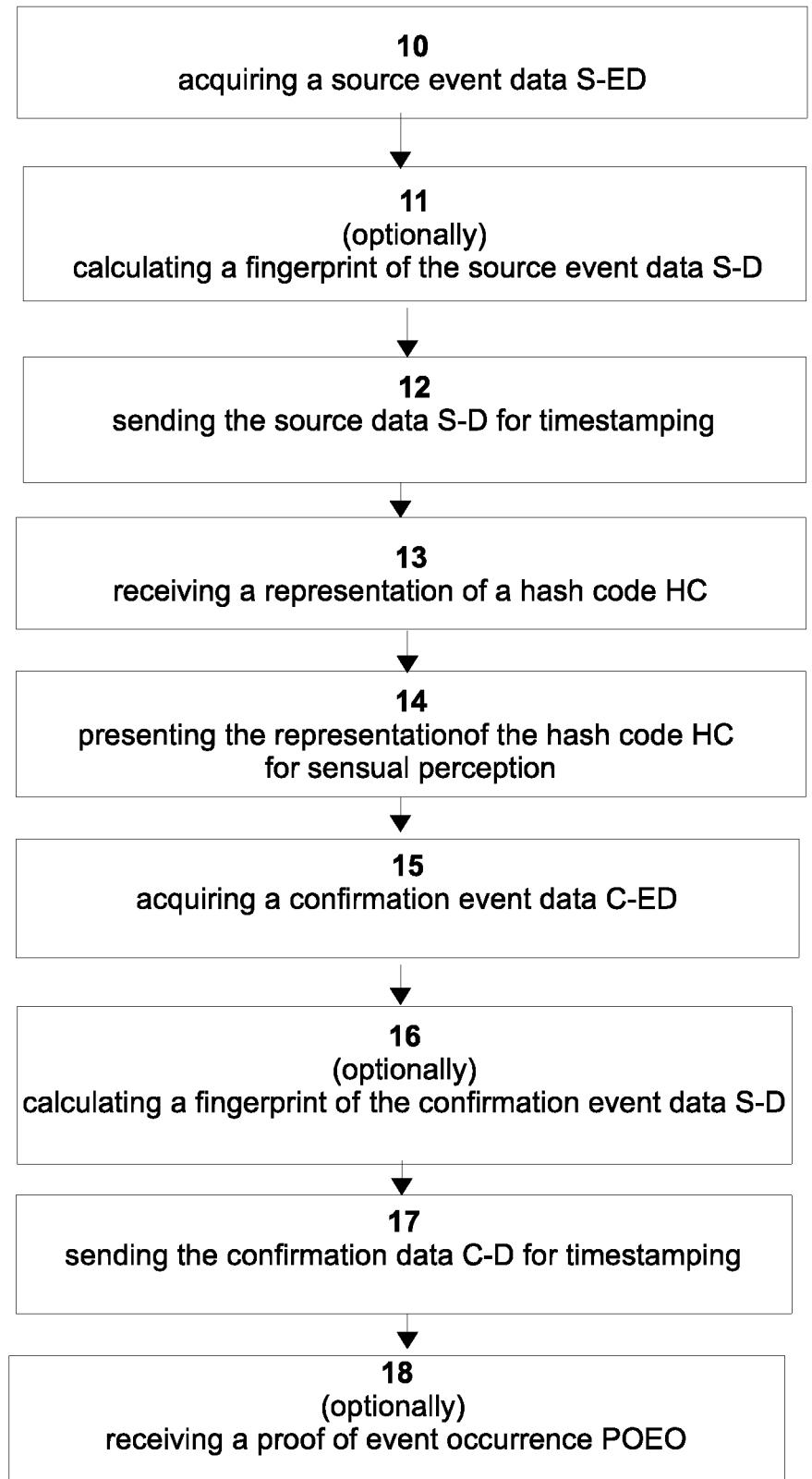
FIG. 3 is a flow chart of the steps performed by the system used by the creator 1.

A shown in FIG. 1 and FIG. 3, the method according to the invention starts by a step 10 of acquiring a source event data S-ED of a source event SE. Here the term a source event SE means an actual event destined to be bound with its real time of its occurrence, in other words, a source event SE is an actual event AE that is to be registered in a reliable manner. The term source event data S-ED (as opposed to a confirmation event data C-ED being acquired later on) means the event data ED of the source event SE (as opposed to a confirmation event CE being documented later on). The proof of use of the technology according to the invention will result from the process of creation/generation of the digital representation of an actual event to be bound with real time of its occurrence as described below.

Figure 2:
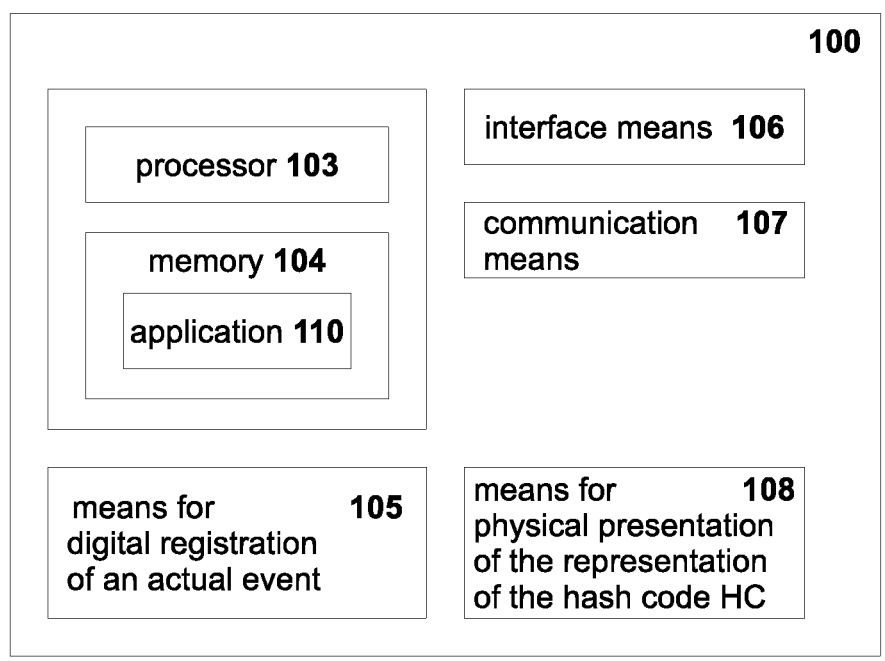
FIG. 2 is a schematic view of a system for generating a digital representation of an actual event bound with the real time of the occurrence of said actual event according to the invention.

The step 10 of acquiring the source event data S-ED is performed by a system 100 (as shown in FIG. 2) for generating a digital representation of an actual event AE bound with the real time of its occurrence. For example, the step 10 as well as other steps depicted in FIG. 3 can be realized by the creator 1 with the use of a smartphone 100, a tablet 100 or a drone 100. However any device or a set of devices comprising all features as described later on in reference to FIG. 2 can be used by the creator 1. As mentioned earlier the acquisition of the source event data S-ED can be performed in a single or continuous mode. Once the data acquisition step 11 is finished a digital representation of an actual event that is to be bound with the real time of the occurrence of said actual event is provided.

Next the method proceeds to a step 12 in which the system 100 output and sends a source data S-D being a representation of the source event data S-ED to an external system 300 for storing and timestamping (time certification). The purpose of sending the source data S-D to specific remote location is to get it stored and timestamped in real time and to enable, based on those data, calculating a unique hash code HC using as hash function having on its input also data describing the state of said immutable database. As it will be described later on in reference to FIG. 4 said remote system 200 comprises a specific immutable database 203 called for the purpose of the present description a digital witness DW 203. As it will be described later on in reference to FIG. 5, the digital witness DW 203 acquires at last said source data S-D for further processing and storage. Here the term source data S-D, being a representation of the source event data S-ED, means full source event data S-ED or their representation, for example, a fingerprint of full source event data S-ED, or encrypted source event data S-ED.

Advantageously, the step 12 of sending the source data S-D for external registration and external time certification, namely timestamping by the immutable database 203, is preceded by a step 11 of calculating a fingerprint of the source event data S-ED. The fingerprint of the source event data S-ED is calculated using hash functions HF. Preferably but not obligatory, if the fingerprint is in use, a significant hash function input data SHFID is then sent along with the source data S-D to the immutable database 203. The term significant hash function input data SHFID means here the data that can be used to uniquely characterize the input data of the hash function HF that calculates a fingerprint. The purpose of a significant hash function input data SHFID is for example:

improving the resistance against tampering the genuine data used by the hash function HF to calculate the fingerprint, minimizing the risk of a collision when calculating the fingerprint—the collision occurs if the hash function HF calculates the same fingerprint for different input data (the risk of collision is practically negligible), determining the size of input data for a hash function HF removal of known or expected (possible) vulnerabilities related to the hash function HF.

A significant hash function input data SHFID can be any data characterizing the input data of a hash function HF (such as first or last few bytes of the input data), however, if the hash function HF has any vulnerability, the significant hash function input data SHFID must at least address this vulnerability so to eliminate it. For example, if a hash function HF is susceptible to the "length extension attack" (although in general using of such a hash function HF is not recommended), a significant hash function input data SHFID must contain at least the information about the size of the input data of the hash function HF.

Regardless of whether the source data S-D is a fingerprint or not, the source event data S-ED can be stored outside the digital witness DW 203. Storing full source event data S-ED is mandatory when they do not exists in the digital witness, for example, if only their fingerprint was sent to the digital witness DW 203.

Once the sending step 12 is finished a digital representation of an actual source event that is to be bound with the real time of the occurrence of said actual event is provided. Next the method proceeds to a step 13 of receiving from a remote source, namely the system 200 (as described later on in reference to FIG. 4) a representation of a hash code HC calculated based at least on: data describing state of said immutable database 203 (digital witness DW 203), the source data S-D and a timestamp of the source data S-D being a timestamp acquired at the time of reception of the source data S-D by the system 200 comprising said immutable database 203. The representation of the hash code HC is called here a transferred hash code THC and its meaning will be given later on in the description.

Next step is a step 14 of outputting, by physical presentation, the representation of the hash code HC for sensual perception. The sensual perception of the representation of the hash code HC is required for the creator 1 to get the knowledge about the code that is to be incorporated into the realm of the actual event being documented. Advantageously, as already mentioned, the representation of a hash code HC referred to as a transferred hash code THC. Hereinafter the term transferred hash code THC means a representation of a hash code HC that is transferred from a digital witness DW 203 to a creator 1 in order to get incorporated into the realm of the source event SE. A transferred hash code THC may be, but is not limited to:
- a full alphanumerical string equal to the hash code HC, or
- an abbreviated form of the hash code HC, obtained with any mathematical function (such as, for example, the RFC4226 by the Internet Engineering Task Force), or
- any other form perceptible by the creators senses representation, such as a word, a graphic sign, a number, a gesture, an action, including the action performed with the device that acquires the event data, or
- a combination of one or more of the aforementioned.

Here, it should be noticed that the method according to the invention is based on a physical incorporation of the content (namely a representation of the hash code HC) that depends at least on: (1) the representation of the event data (prior to the incorporation the representation of said code), (2) the current time and (3) a state of the digital witness DW 203 (immutable database 203). The said content must be incorporated into the realm of the actual event, whereas the role of the digital witness DW 203 is to store the representation of event data ED before and after the incorporation of the said content into the realm of the actual event AE. It is very important to distinguish the "realm of the actual event" from binary content of the event data ED. From logical point of view the event data ED may be considered as a binary representation of some actual event AE, with its realm, that can be displayed and recognized in a sensual way (human processing), as well as a set of bytes, that is a subject for machine processing. Hereinafter the term 'realm of the actual event' means the physical layer (the environment) of the actual event being captured as opposed to a 'binary content' of the event data ED. In a result, the incorporation of the representation of the hash code HC into the realm of the actual event refers to all activities that will result in a physical recognition of the incorporated content in the physical layer of the depicted actual event. The incorporation into realm of the actual event in particular does not mean any binary changes to the acquired event data ED.

The incorporation of the transferred hash code THC into the realm of the source event SE is executed in such way as to provide the unquestionable proof that the representation of the hash code HC was known in the moment of its incorporation. For example, if the incorporation was performed by writing the representation of the hash code HC (the transferred hash code THC) on a piece of paper and this piece of paper was placed within the context of the source event SE, and the confirmation event data C-ED is a photo, the transferred hash code THC written on the piece of paper should be legible in this photo.

An important issue is the incorporation of the transferred hash code THC into the realm of the source event SE if physical presence of the creator 1 within the realm of the source event SE is impossible, for example, when acquiring event data ED in a continuous mode using a drone camera. In this case the only possible interaction with the realm of the source event can be performed with the event data ED acquiring device, namely the system 100. The transferred hash code THC in this case should be one or more actions that can be executed by the creator 1 with a remote event data acquiring device (for example, a drone with a camera), including but not limited to a change in a perspective, an angle or a frame of the acquired event data, so to make incorporation of the transferred hash code THC recognizable in the context of acquired confirmation event data C-ED.

To summarize, incorporation of the representation of the hash code HC, namely of the transferred hash code THC into the realm of the source event SE is the act of physically transferring the transferred hash code THC by the creator 1 into the physical realm of the source event SE (the realm in which the actual, source event occurs), in any possible way, so to create a confirmation event CE (that binds the source event SE and the transferred hash code THC together), in order to provide unquestionable certainty that the creator 1 knew the transferred hash code THC at the moment of its incorporation into the realm of the source event SE. The incorporation of the transferred hash code THC into the physical realm of the source event SE can be for example: for single events—writing the transferred hash code THC, preferably by hand, on a piece of paper and placing this piece of paper within the context of the source event SE, for continuous events—video recording the process of writing the transferred hash code THC within the context of the source event SE, preferably by hand, or speaking the transferred hash code THC loudly, preferably by the creator, without interrupting the event data acquisition.

The incorporation of the transferred hash code THC into the realm of the source event SE should not be performed without interaction between the realm of the event and the creator 1 himself/herself. Therefore, for example, if the event data are acquired remotely (for example, with a drone camera), and the creator 1 does not have the possibility of direct incorporation of the transferred hash code THC into the realm of source event SE, the incorporation must be executed by performing the action or actions corresponding to the content of the transferred hash code THC (including, but not limited to, changing the aspect, zoom, or angle of acquired event data).

Next the method proceeds to a step 15 of acquiring a confirmation event data C-ED of the confirmation event CE, the confirmation event CE being the source event SE comprising additionally incorporated into its realm the representation of the received hash code HC, called hereinafter also the transferred hash code THC.

If the event data ED is acquired in a continuous mode. i.e. as an uninterrupted video or a sound recording, the confirmation event data C-ED can contain the source event S-ED (namely the source event data S-ED can be a part of the confirmation event data C-ED). In this case the source data S-D is sent to the digital witness DW 203 without interrupting the event data ED acquisition. Also in this case the incorporation of the transferred hash code THC into the realm of the source event SE takes place in real time and the confirmation data C-D being a representation of the confirmation event data C-ED is sent to the digital witness DW 203 immediately after finishing the acquisition of the confirmation event data C-ED.

If the continuity of the event data ED acquired in a continuous mode is preserved, the real time of the occurrence of all actual events contained in the source event data S-ED and the confirmation event data C-ED can be determined. Preserving the continuity of continuously acquired event data ED means that it should enable the sensual (e.g. visual and/or aural) verification of event depicted during the verification process. A negative example of the event data ED acquired in the continuous mode that do not preserve the continuity can be a video recording that has small amount of details, is blurred, has bad light exposure at all, contains a visual noise or noises instead of clear sounds.

If the source event data S-ED is stored only as a part of the confirmation event data C-ED (for example, in case of a continuous mode of event data ED acquisition), storing the information about the size of the source event data S-ED, preferably in the digital witness DW 203, should be mandatory for the sake of generation of a representation of the hash code HC. If said information is missing, the size of the source event data S-ED can in theory be determined using time consuming "brute force" method. This method generate the representation of the hash code HC using as the representation of the source event data S-ED increasing number of initial bytes of the confirmation event data C-ED, until the representation of the hash code matches the corresponding value saved in the digital witness 203. The "brute force" method is time consuming and in theory it can lead to ambiguities.

If the source event SE is registered in a single mode (for example, as a photo), then, for the sake of the time accuracy, the incorporation of the transferred hash code THC into the realm of the source event SE as well as the acquisition of the confirmation event data C-ED and sending the confirmation data C-D, being a representation of the confirmation event data C-ED, to the digital witness DW 203 should happen after one another preferably in the shortest possible time. (In this embodiment the time of the event occurrence may be established with an accuracy of a few seconds, or near real-time).

Next step is a step 17 of outputting and sending a confirmation data C-D being a representation of the confirmation event data C-ED to an external system 200 for storage and timestamping (time certification), so as to provide a confirmation of incorporation of the transferred hash code THC into the source event SE.

Here the term confirmation data C-D, being a representation of the confirmation event data C-ED, means full confirmation event data C-ED or their representation, for example, a fingerprint of full confirmation event data S-ED, or encrypted confirmation event data C-ED To ensure the most exact confirmation of the time of the occurrence of an actual event possible, and to ensure the most reliable timestamping process possible, both the source data S-D and the confirmation data C-D should be sent to the digital witness DW 203 as soon as it is possible after their acquisition:

in case of a continuous mode of event data acquisition (for example, a video/sound recording)—the source data S-D should be sent to the digital witness DW 203 and recorded therein in real time, without interruption of event data acquisition, while the confirmation data C-D should be sent to the digital witness DW 203 and recorded therein just after finishing the acquisition of the confirmation event data C-ED, in case of a single mode of event data acquisition (for example, a photo)—directly after finishing the acquisition of the source event data S-ED and directly after finishing the acquisition of the confirmation event data C-ED.

Advantageously the step 17 of outputting and sending a confirmation data C-D for external registration and external time certification by an immutable database 203, is preceded by a step 16 of calculating a fingerprint of the confirmation event data C-ED. The fingerprint is calculated using hash functions HF. Preferably but not obligatory a significant hash function input data SHFID is then sent along with the confirmation data C-D to the immutable database 203. Regardless of whether the confirmation data C-D is a fingerprint of the confirmation event data C-ED or not, the confirmation event data C-ED can be stored locally by the creator 1. For example the creator 1 can store it in the memory of the system 100 or on a computer readable data carrier (not shown). All the provisions referred to fingerprints of the source even data S-ED described earlier apply here.

It should be noticed, that using fingerprints (a fingerprint of the source event data S-ED and/or a fingerprint of the confirmation event data C-ED) in the step 12 or in the step 17 is a convenient option, for example, if the source event data S-ED or confirmation event data C-ED has a large size, if the bandwidth of the connection with an external immutable database, namely the digital witness DW 203 is too low to provide the effective data transfer, or if the full event data for some reason should be secret.

The full event data used to calculate each fingerprint must be stored in any, not necessarily the same location chosen by the creator 1, or in the digital witness DW 203, because it is required in the verification process both to recalculate the fingerprint and for the sensual inspection.

Once the step 17 of sending acquired confirmation event data C-ED for external registration and time certification to the digital witness DW 203 is finished, a digital representation of an actual event bound with the real time of the occurrence of said actual event is provided. Thus, a digital representation of an actual event bound with its real time is created as a result of two separated physical acts of registration on the creator's side.

Advantageously, as shown in FIG. 3, the method of generating digital representation of an actual event bound with the real time of the occurrence of said actual event according o the invention and performed by a system 100 comprises an additional step 18 of receiving of proof of event occurrence POEO. This optional step 18 involves receiving from the immutable database 203 a confirmation of storing the source-data S-D and/or the confirmation data C-D, preferably with corresponding timestamps of the source data S-D and/or the confirmation data C-D and the hash code HC. Hereinafter the term proof of event occurrence POEO is an optional final information received by the system 100 containing any data useful for the sake of convenient and reliable checking the bond between the event depicted in the source event data S-ED with its time of occurrence. These data can contain for example: the source event-data S-ED, the timestamp of the source event data S-ED, the hash code HC, the transferred hash code THC with its method(s) of generation, the confirmation event data C-ED, the timestamp of the confirmation event data C-ED, C, the confirmation hash code CHC (calculated for example, by the system 200 or immutable database 203, as explained later on), information about the location of the data in the digital witness DW 203, a type and a name of the digital witness DW 203, methods of calculation/generation for each of the aforementioned values, information about the significant hash function input data SHFIDs, information about the source(s) of the timestamps for the source event data S-ED and the confirmation event data C-ED, as well as other relevant information.

It should be noticed, that the event data acquired before (the source event data S-ED) and after (the confirmation event data C-ED) the incorporation of the transferred hash code (THC) into the realm of the source event (SE), should depict the same actual event AE.

Moreover, the source event data S-ED and the confirmation event data C-ED must depict the same actual event AE, however they do not necessarily have to be acquired in the same mode (single or continuous). For example, the source event data S-ED can be acquired in a single mode, as a photo, while the confirmation event data C-ED can be acquired in a continuous mode, as a video recording.

The method of the present invention can be repeated more than once in relation to the same actual event. This may be important if single (non-continuous) mode event data acquisition is in use.

As shown in FIG. 2, the system 100 for generating a digital representation of an actual event bound with the real time of its occurrence is any device or set of devices comprising a processor 103 and a memory 104 and further comprising means 105 for digital registration of an actual event AE. Said means 105 for digital registration of the actual event AE can be for example, a camera, a microphone or both. Preferably but not obligatory, the system 100 comprises interface means 106 to enable the creator 1 interacting with the system 100. Said interface means 106 are important in this case the only possible interaction with the realm of the source event can be performed with the event data ED acquiring device, namely the system 100. The transferred hash code THC in this case should be any action that can be executed by the creator 1 with a remote event-data acquiring device (for example, a drone), including but not limited to a change in a perspective, an angle or a frame of the acquired event data, so to make it recognizable by the user 4.

The system 100 is also able to communicate with other systems using communication means 107. The system 100 comprises also means 108 for outputting by physical presentation the representation of the hash code HC for sensual perception of the creator 1. This can be a display 108, or headphones 108 or a printer 108, speaker 108, loudspeaker 108, light emitting device such as a diod 108, vibration motor 108.

In other words, in order to bind the acquired event data ED with real time of its occurrence, the creator 1 should have technical means to perform the method according to the invention. Preferably, if the creator 1 is a human, he or she, when performing the method according to the invention, should use a device/a system 100 that acquires the event data ED and can access a digital witness DW 203. This system/device 100 must comprise technical means to effectuate the steps of the method on the creator's side. Those means shall include a computer program 110, for example a mobile application 110 downloaded or embedded within the production process into said system 100/device 100.

Figure 4:
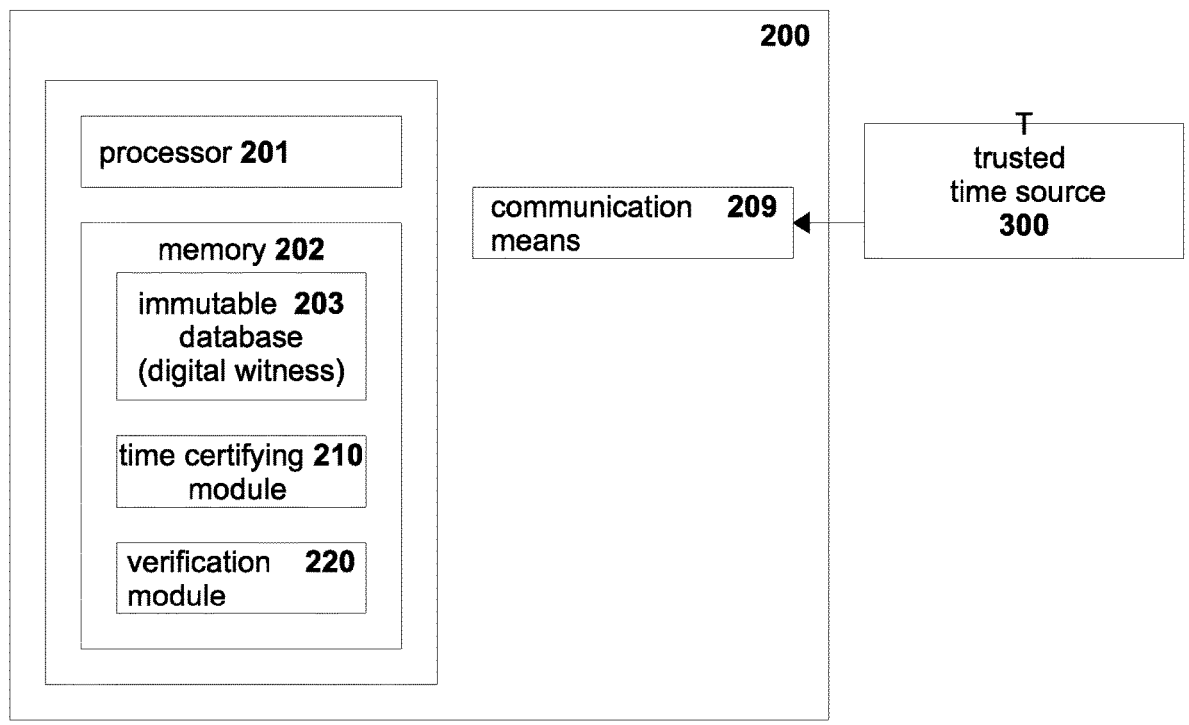
FIG. 4 is a schematic view of the system according to the invention comprising an immutable data base.

As shown in FIG. 4 the system 200 for providing time certification of a digital representation of an actual event to be bound with the real time of its occurrence according to the invention comprises at least one processor 201 and at least one memory 202. The at least one memory comprises an immutable database 203 called here, as mentioned earlier, a digital witness DW 203. The system 200 can be for example a server 200 or a set of servers 200.

Here the term digital witness DW 203 means one or more data structure that stores the data. The digital witness DW 203 acts as a replacement for human witness in this invention. The digital witness DW 203 must be immutable (i.e. its data cannot be deleted or modified). The digital witness DW 203 is preferably public, preferably open, and preferably decentralized. An example of a digital witness DW 203 is a blockchain.

A system 200 incorporates also the functions for data operations such as, for example, recording, storing, retrieving, displaying, and searching the data, as well as checking for integrity of the data of immutable database 203, defining the state of the immutable database 203, and hashing. All these functions are preferably open and public. These functions enable operations, such as:

- data processing (such as recording, storing, retrieving, displaying, searching, using in calculations etc.), including all the calculated and generated data, as well as the external (acquired and uploaded) data,
- acquiring a timestamp from at least one trusted source 300,
- determining state of the digital witness DW 203,
- using one or more, same or different hash functions HFs to calculate an output that will be used, for example, as a:
  - hash code HC
  - confirmation hash code CHC
  - state of the digital witness DW 203
  - source or a confirmation fingerprint (FP),
- generating a significant hash function input data SHFID
- converting a hash code HC into its representation, namely into a transferred hash code THC
- transferring a THC back to a creator 1 or a user 4.

For the sake of the highest reliability possible, each fingerprint should be calculated by the system 200, after uploading appropriate event data. However, if this is not possible, for example if the size of the event data ED is large, corresponding fingerprint can also be calculated outside the system 200, for example, locally by the system 100, according to the method stored in the system 200, for example, with the help of a mobile device 100 containing an appropriate application 110.

Following information must be stored, preferably in the digital witness DW 203, in a way as to allow the exact and unambiguous recalculation and verification of all of the aforementioned values:

- the complete, detailed information about the methods used to calculate each of the aforementioned values (i.e. the hash code HC, the confirmation CHC, the state of the immutable database, as well as the fingerprint(s) and/or significant hash function input data SHFID if apply, with the methods used to generate said fingerprints and/or significant hash function input data SHFID.
- the complete, detailed information about the source(s) 300 for each acquired timestamp,
- the complete detailed information about the method used to generate a representation of the hash code HC (referred to also as the transferred hash code THC).

To provide maximum reliability, all information contained in the digital witness DW 203, should be public, including complete and detailed information about all used functions and methods.

Any database that is immutable by design can be a digital witness DW 203. However, in the recent times, a new technology called "blockchain" has emerged. This technology provides, at a very low cost, not only immutability of the stored data, but also the indestructibility of the data. In the literature, blockchain technologies are referred to as "trustless", as the concept of "trust" known heretofore in the human civilization is not needed any longer for unquestionable credibility of the record.

To provide a trust-free, unquestionable bond between a source event SE and its real time of occurrence, the digital witness DW 203 stores a record that contains at minimum following data related to the source event SE and the confirmation event CE: a source data S-D, being a representation of a source event data S-ED, a timestamp of the source data S-D, a representation of the hash code HC (if it is not equal to the hash code HC), a confirmation data C-D, a timestamp of the confirmation data C-D.

The system 200 for time certification also comprises communication means 209 to enable communication with the system 100 as well as with a reliable time source 300.

In order to perform all actions required by the invention, the system 200 is provided at least with an application 210, namely a digital representation time certification software module 210 comprising executable instructions. However the person skilled in the art will know that different functions can be implemented as a software in different hardware parts of the system 200 (said software being for example, firmware).

Figure 5:
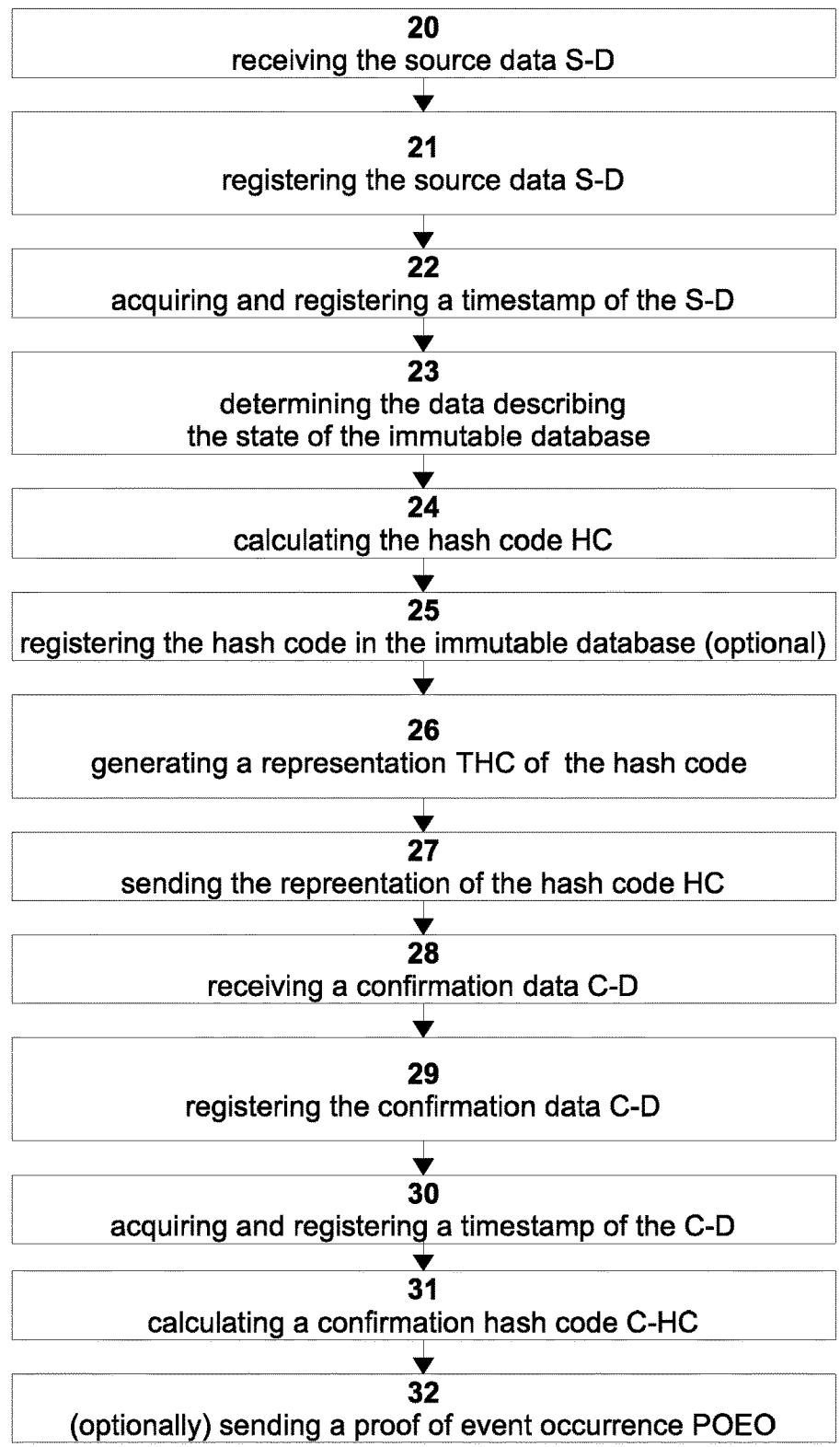
FIG. 5 is a flow chart of steps performed by the system comprising an immutable database according to the invention

Now in reference to FIG. 5 a method of time certification will be described. Said method of providing time certification of the digital representation of an actual event bound with the real time of the occurrence of said actual is used by a remote system 200 (depicted in FIG. 4) to process and store data received from the system 100 of the creator 1. Said method is performed simultaneously with the method as described in reference to FIG. 3. The method begins by a step 20 of receiving a source data S-D from the system 100 (as described earlier).

As mentioned earlier in the step 20 of receiving the source data S-D different type of data can be received by the system 200 for this purpose, namely full source event data S-ED or a fingerprint of the source event data S-ED. To provide the highest level of the event data reliability, if a fingerprint is used, a significant hash function input data SHFID of the fingerprint should be calculated and recorded into the digital witness DW 203. Preferably, the method of generation of the fingerprint and, if applicable, the method of generation of the significant hash function input data SHFID should also be recorded into the digital witness DW 203. The SHFID is particularly important if the full event data used to calculate a fingerprint is stored outside the digital witness DW 203, for example, locally.

Once the source data S-D is received by the system 200 comprising the digital witness DW 203, the method proceeds to a step 21 of storing said source data S-D in the digital witness DW 203.

Next the method proceeds to a step 22 of acquiring from a trusted source 300 a timestamp for the source data S-D. The system 200 using communication means acquires a timestamp of the source-data S-D in the moment of the acquisition of the source data S-D or instantly after their recording into the digital witness 203. More than one source of time for timestamping purposes may be used. The information about these source(s) is stored in the digital witness DW 203. The process of timestamping the source data S-D refers to acquiring a timestamp of the source data S-D from trusted source and recording this timestamp in the digital witness DW 203.

Next the method proceeds to a step 23 of determining data describing the state if immutable database 203 (the digital witness DW 203) at a particular time indicated by the timestamp of the source data S-D. Here, the term state of immutable database 203 means any data providing a mathematical or logical proof that some other data existed in the digital witness DW 203 in a specified moment of time. The said state of immutable database is calculated for the data existing in the digital witness DW 203 in the moment when the source data S-D is received from the system 100 of the creator 1 (before either the source data S-D or the timestamp of the source data S-D is recorded into the digital witness DW 203, whichever comes first). Said data describing the state of the immutable database (the digital witness DW 203) can be for example a fingerprint of the full data or of a part of the data stored in the digital witness DW 203. The data describing the state of preferably the immutable database 203 (the digital witness DW 203) is calculated by the system 200, according to the method that is stored in the system 200, as to allow its fast and easy recalculation when required.

Next the method proceeds to a step 24 of calculating a hash code HC based on the data describing the state of the immutable database 203, the source data S-D, and the timestamp of the source data S-D. Here, the term hash function HF means any, public (open) mathematical function that maps data of some arbitrary size into a bit string of a fixed size (a hash). Thanks to its mathematical properties, the output of the hash function HF can be regarded in two ways: as a fingerprint or as a checksum. A cryptographic type of a hash function HF is preferred for the present invention. A cryptographic hash function HF is characterized in that it can withstand any type of known cryptanalytic attacks: it has at least the property of pre-image resistance, second pre-image resistance, and collision resistance. The hash function HF that have proven vulnerability (i.e. that are susceptible to attack) should not be used unless this vulnerability can be excluded, at best, by a design of the system 200 and/or the design of the digital witness DW 203. For example the output of a cryptographic hash function HF that directly uses the full output of a Merkle-Dåmgard construction is vulnerable against a length extension attack, so in order to minimize the risk related to this type of attack, the digital witness DW 203 must store the information about the size of the hash function HF input data (for example, as a significant hash function input data SHFID).

The system 200 may offer one or more, same or different hash functions HFs to calculate fingerprint of source data S-D, of confirmation data C-D, to calculate the hash code HC, the state of the immutable database 203 (the digital witness DW 203), and, if applicable, the transferred hash code THC.

The system 200 can allow user-defined hash functions HFs to be used, however the reliability of user-defined hash functions HFs may be questionable and thus these hash functions HFs are not recommended. To ensure maximum reliability, each user-defined hash function HF that is used, must be stored in the digital witness DW 203, including its complete algorithm.

Next step is a step 25 of registering the hash code HC (calculated in step 24) in the digital witness DW 203. This step is optional, however it speeds up the calculations in the process of verification.

Next the method proceeds to a step 27 of sending a representation of the hash code HC to the system 100. As mentioned earlier, the representation of the hash code HC is called hereinafter the transferred hash code THC. The representation of the hash code HC is performed in a transferred hash code THC generation step 26. It should be notice however that the transferred hash code THC can be also full hash code HC. The system 200 may offer different methods of converting the hash code HC to the transferred hash code THC. If not defined within a system 200, these methods of conversion have to be stored in the digital witness 203 in such a way as to enable reliable conversion of the hash code HC to the transferred hash code THC. The transferred hash code THC is used the sake of the user-friendliness, or in order to speed up the execution of the method of the present invention or due to other factors. Therefore the step of sending the representation of the hash code HC can be preceded by the step 26 of converting the hash code HC into its representation, namely the transferred hash code THC.

Said conversion methods include but are not limited to: shortening of the hash code HC with help of an abbreviating function, converting the hash code HC into some set of actions or gestures that have to be performed (repeated) by the creator 1 (for example, saying out loud the transferred hash code THC, performing hand gestures, redrawing the shape, moving/zooming the camera in a specific way in order to change the frame or angle of acquired event data).

Each method that converts a hash code HC into its representation, namely into a transferred hash code THC is sufficient as long as the user 4 is able to recognize it in the event depicted in the confirmation event data C-ED without any doubt. It should be notice once again that the transferred hash code THC can be also full hash code HC.

Next step is a step 28 of receiving confirmation data C-D of a confirmation event CE, the confirmation event CE being the source event SE comprising additionally incorporated into its realm the representation of the hash code HC, while the confirmation data C-D is a representation of the confirmation event data C-ED.

Next the method proceeds to a step 29 of registering said confirmation data C-D, being a representation of the confirmation event data C-ED, into the digital witness DW 203. All the provisions referred to fingerprints and significant hash function input data SHFID described earlier apply here.

Next step is a step 30 of acquiring, from a trusted time source 300, a timestamp for the confirmation data C-D and registering it in the immutable database 203.

The system 200 using communication means acquires a timestamp of the confirmation-data C-D in the moment of the acquisition of the confirmation data C-D or instantly after their registration in the digital witness 203. More than one source of time for timestamping purposes may be used. The information about these source(s) is stored preferably in the digital witness DW 203. The process of timestamping the confirmation data C-D refers to acquiring a timestamp of the confirmation data C-D from trusted source and recording this timestamp in the digital witness DW 203.

Then the method proceeds optionally to a step 31 of calculating a confirmation hash code CHC using a hash function HF, that has on its input at least: the confirmation data C-D, a timestamp of the confirmation data C-D, and the hash code HC. The confirmation hash code CHC is registered in the digital witness DW 203. The confirmation hash code CHC can be used to provide fast and easy check for data integrity when standalone proof of actual event occurrence is extracted out of a digital witness 203, for example to be used during the trial.

Optionally the method of providing a time certification performed by the system 200 comprises a step 32 of preparing and sending the proof of event occurrence POEO. This is the user-friendly information referring to registered actual event, that preferably should contain: the time of the occurrence of actual source event SE, the time of occurrence of confirmation event CE, the hash code HC, the transferred hash code THC (if applies), the name of the digital witness DW 203 and the position of the record in the digital witness DW 203.

Now the method of providing data for verification of the digital representation of the actual event bound with the real time of its occurrence will be described as well as the method of verification of the digital representation of the actual event bound with the real time of its occurrence. In practice those methods are performed also on a least two remotely localized systems, namely the system 200 comprising the digital witness DW 203 and the system 400 of the end user 4 respectively.

Actions performed by the system 200 during the method of verification will be described in reference to FIG. 6, while actions taken by the system 400 of the user 4 will be described in reference to FIG. 7. Those actions are performed thanks to a verification process software module 220 embedded into the system 200 and a known means or dedicated software module embedded into the system 400.

Here the term user 4 means one or more human or one or more entity, including artificial intelligence or similar algorithm(s), that is able and/or has technical means to verify the link between the actual event AE and its real-time timestamp, created by the creator 1 by means of the system 100 and stored in the digital witness DW 203.

As mentioned earlier the invention uses the event data depicting the same actual event before and after incorporation of the transferred hash code THC into the realm of the source event SE. If the event depicted in the event data contains appropriate amount of details, a user 4 is able to tell if the different event data (such as a source event data S-ED and a confirmation event data C-ED) represent the same actual event.

In general for the purpose of the said verification process, the complete data stored in the process of generating the digital representation of the actual event bound with the real time of its occurrence are required. This complete data will be hereinafter referred to as verification data VD. The verification data VD are the data stored in the digital witness 203, as well as the data stored elsewhere that in the digital witness 203, including:
 source event data S-ED, with their fingerprint and/or significant hash function input data SHFID, if applicable
 confirmation event data C-ED, with their fingerprint and/or significant hash function input data SHFID, if applicable
 timestamp of the source data S-D, being a representation of the source event data S-ED
 state of the immutable database in the moment of time indicated in the timestamp of the source data S-D
 timestamp of the confirmation data C-D, being a representation of the confirmation event data C-ED
 hash code HC and its representation (being the transferred hash code THC)
 confirmation hash code CHC, if applicable
 proof of event occurrence POEO, if applicabla
 methods used to:
  generate the source data S-D (being a representation of the source event data S-ED)
  generate the confirmation data C-D (being a representation of the confirmation event data C-ED),
  generate fingerprints, if applicable
  generate a significant hash function input data SHFID, if applicable
  generating a hash code and the representation of the hash code (being a transferred hash code THC)
  generating a confirmation hash code CHC, if applicable generating a proof of event occurrence POEO, if applicable.

The verification process runs in several steps, however the main purpose of them is to confirm consistency of the verification data VD and then to retrieve the source event data S-ED and the confirmation event data C-ED for inspection performed by means replacing functions of human senses or by human senses.

Confirming of the consistency of the verification data VD consists of rebuilding and recalculating all values according to the stored information, so to mathematically prove that:
the digital witness DW 203 in the moment of acquiring a timestamp for the source data S-D was in some particular state
the source data S-D is a representation of the source event data S-ED
the confirmation data C-D is a representation of the confirmation event data C-ED
the transferred hash code THC is a representation of the hash code HC
the hash code HC stored in the digital witness 203 can be recalculated according to the method described in the invention
optionally, the confirmation hash code CHC stored in the digital witness 203 can be recalculated according to the method described in the invention.

If any of actions described above is not successful, the verification process failed and cannot proceed.

For the sake of the verification process the recalculation of the state of the digital witness DW 203 is always performed for the particular state of the digital witness DW 203 in time moment indicated by the timestamp attached to the source data S-D.

In general, the process of confirming the consistency of the data is optional for the method and can be performed by the system 200 and/or by the system 400.

In practice, verification data VD required by the system 400 for checking consistency are extracted during the steps of the method of providing data for verification of the digital representation bound with the real time of its occurrence comprises on the system' 200 side. Namely, the system 200 receives a query about the verification data VD, i.e. data concerning an actual event of interest being bound with the real time of its occurrence and generated according to the invention. Then the system 200 checks whether the data concerning said actual event of interest exist in an immutable database 203 being queried. Finally, the system 200 sends the queried data concerning said actual event of interest. Simultaneously, but not obligatory the system 200 itself can check consistency of the verification data VD. As mentioned earlier, confirming the consistency of the data stored in the digital witness DW 203 (despite its immutability) is only a desired step in the verification process.

Once the data consistency is confirmed, the proof that the event depicted in the source event data S-ED can be linked to timestamp of the source data S-D (being a representation of the source event data S-ED), is determined by the combination of:
sensual or automated human-free comparison of the actual event depicted in the source event data S-ED with the actual event depicted in the confirmation event data C-ED, and
checking if the transferred hash code THC incorporated into the realm of the source event SE, recognizable in the confirmation event data C-ED, is the same as the transferred hash code THC that is stored in the digital witness DW 203,
in any order.

Checking can be also performed in a fully automated way or semi-automated way with the use of the system 400 with or without AI (or similar) algorithms respectively.

In one embodiment, on the user's side the following steps of a method of verification of the digital representation bound with the real time of its occurrence are performed. First, after querying the system 200 for verification data VD in a step 50 of querying, the verification data VD are retrieved in the step 51 from the system 200 comprising an immutable database 203 said verification data VD concerning the event of interest generated by the method according to the invention, said data being at least: a representation of a hash code HC, a source data S-D and a confirmation data C-D. Then, optionally after checking for consistency in a step 52, and optionally after reconstructing necessary data in a source data S-D and confirmation data C-D reconstruction step 53, the system 400 in the step 54 finds in the representation of the hash code HC within the context of an actual event registered as a confirmation event data C-ED using AI or similar algorithm. Finally, the system 400 compares a source event SE registered represented by the source data S-D and a confirmation event CE represented by a confirmation data C-D using AI or similar algorithm.

"Sensual comparison" means that the confirmation is performed by the user 4 with the help of the human senses, or by means equal to the human senses (as described in reference to mentioned embodiment). If the user 4 is human, the confirmation can be performed for example visually or aurally. The user 4 that performs the verification can be a human provided with the system 400, but as mentioned earlier, can be fully replaced by said system 400 comprising electronic algorithm, including artificial intelligence, that is capable of completion of steps described herein.

The sensual inspection is also sufficient to compare event data acquired in different modes—for example if prior to the incorporation of the representation of the hash code HC (namely the transferred hash code THC) into the realm of SE the event data was acquired in a single mode (for example, as a photo) and after the incorporation—in a continuous mode (for example, as a video recording).

If the event data were acquired without interruption in a continuous mode (such as, for example, a video recording) and the creator 1 preserved the continuity of the event depicted in the acquired event data, there is an additional possibility of determining the precise time of occurrence of all actual events that happened prior to and after the exact moment of time indicated by the timestamp of a source-data S-D and/or a confirmation data C-D. This feature can also be used to prove a real-time multimedia streaming.

So far the possibility of the sensual evaluation by a human is more preferred than the conduction of this evaluation by any electronic means, considering the potential use of the invention for providing proofs in lawsuits and considering the current standards of operation where the concept of a human witness is recognized.

As mentioned earlier, the verification process runs on the system 400 of the user, which must know the digital witness DW 203 (the immutable database 203) that stores information about an event of interest. Since several embodiments can be differentiated depending on what kind of data were generated in order to bind the actual event with it real time of occurrence and depending on where said data have been stored, there are also several corresponding embodiments of the process of verification.

In exemplary embodiment if the system 100 of the creator 1 used a source data S-D that were not equal to the source event data S-ED the system 400 of the user 4 must have the source event data S-ED. If the creator 1 used confirmation data C-D that were not equal to a confirmation event data C-ED the system 400 of the user 4 must have the confirmation event data C-ED.

If the system 400 of the user 4 has only one file (i.e. when event data acquisition was continuous and the source event data S-ED is a part of the confirmation event data C-ED), the system 400 must extract the source event data S-ED from the confirmation event data C-ED, basing on the size of the source event data S-ED. If in this case the information about the size of the source event data S-ED is missing the system 400 of the user 4 can theoretically apply a time-consuming "brute-force" method to determine the size of the source event data S-ED and to retrieve it from the confirmation event data C-ED.

For the sake of simplification of the verification process, the creator 1 using his system 100 may provide the user 4 with the proof of event occurrence POEO for example, by communicating with the system 400, the said proof of event occurrence containing data relevant in verification process.

Figure 6:
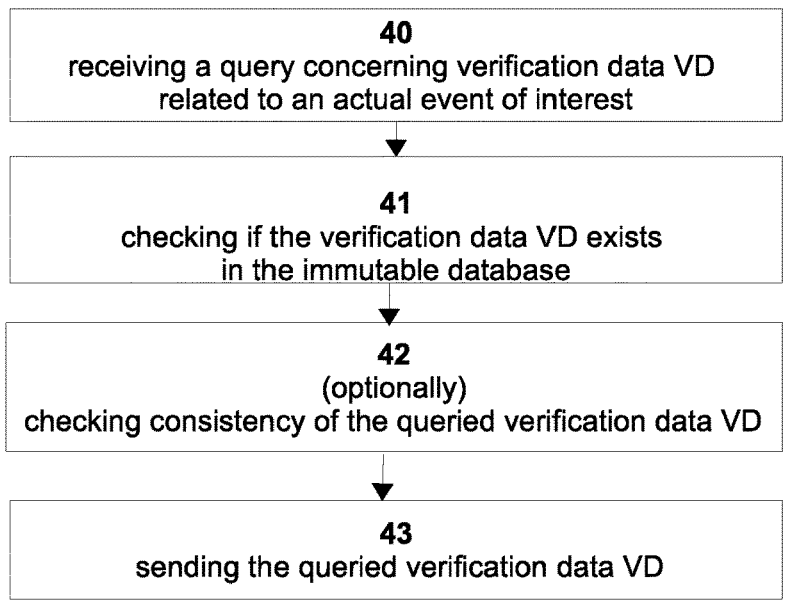
FIG. 6 is a flow chart of steps performed by the system comprising the immutable data base in order to enable checking unquestionable time of occurrence of an actual event depicted in a digital representation
Figure 7:
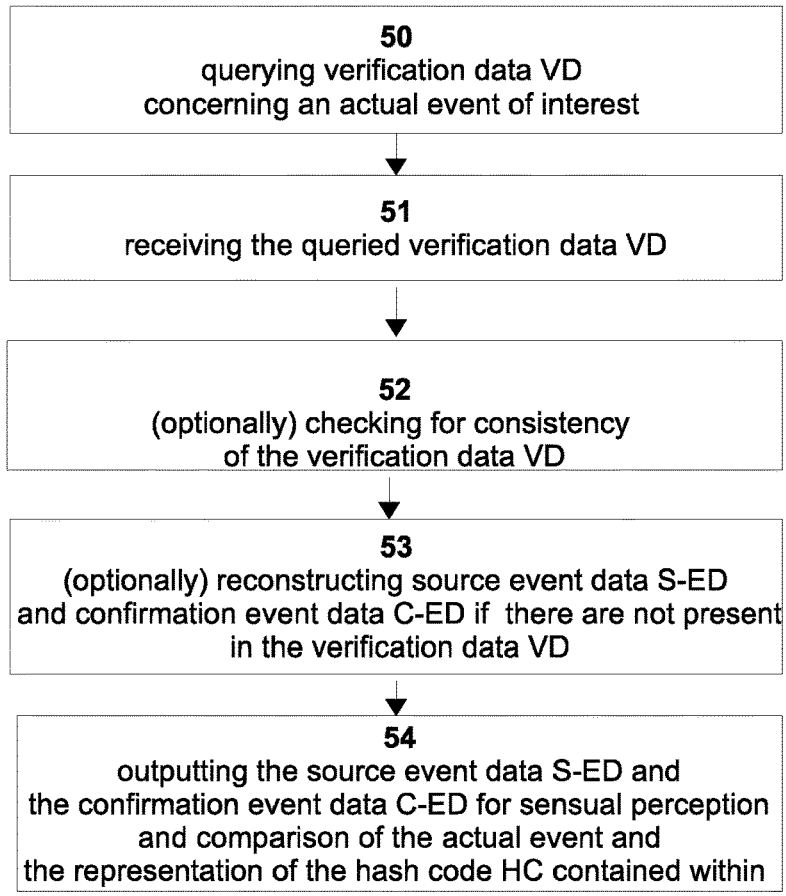
FIG. 7 is a flow chart of steps performed by the end user 4 in order to check unquestionable time of occurrence of an actual event depicted in a digital representation

In reference to FIG. 6 and FIG. 7 it can be noticed that in a step 40 of receiving a query about the data concerning the event of interest, the digital witness DW 203 is queried by the system 400 of the user 4 for the data concerning the event of interest and of course generated according to the method of generating a digital representation of an actual event bond with its real time of occurrence according to the invention:

if full source event data S-ED and full confirmation event data C-ED were stored in the digital witness DW 203, the time when the event of interest occurred, known to the creator 1 and/or to the user, is sufficient for querying for the data concerning the event of interest, in other cases (for example if the time of the event occurrence is not precisely known), the query should be based on any data linked to the event of interest, for example, the source data S-D, the confirmation data C-D, or the transferred hash code THC.

In a step 41 of checking the presence of the queried data, it is checked checks whether the queried data are present in the database. If the queried data is found in the digital witness DW 203, the verification data VD are retrieved.

In a step 42 of checking consistency of queried data and optionally simultaneously locally consistency of queried data, the hash code HC and the confirmation hash code CHC are recalculated (for example, by the system 200 and/or locally by the system 400 of the user) to check for data consistency. If any of the recalculated values does not match the corresponding value stored in the digital witness DW 203, the verification process failed.

It the either of the source data S-D is not equal to the source event data S-ED and/or the confirmation data C-D is not equal to the confirmation event data C-ED, a confirmation must be obtained, that both of the aforementioned data are representation of the source event data S-ED or confirmation event data C-ED respectively.

a) If the source data S-D are not equal to a source event data S-ED and corresponding source event data S-ED are stored in the digital witness DW 203, the source-data S-D are recalculated (by the system 200 and/or locally by the system 400 of the user), according to the information retrieved from the system 200.

b) if the source data S-D are not equal to a source event data S-ED and corresponding source event data S-ED are stored outside the digital witness DW 203 the system 400 of the user 4 has to:

i) locally recalculate out of the source event data S-ED the source-data S-D according to the retrieved information about the source data S-D ii) upload the S-ED to the system 200, so to let the system 200 perform the said recalculation according to the retrieved information about source data S-D.

c) If the recalculated source data S-D of the source event data S-ED does not match the corresponding source data S-D stored in the digital witness DW 203, the verification process failed.

d) If the confirmation data C-D is not equal to a confirmation event data C-ED the process is the same as in for the source-data S-D being not equal to a source event data S-ED.

After data consistency is confirmed, the source event data S-ED and the confirmation event data C-ED have to be represented, depending on their type, for example, displayed or played, in order to allow their sensual inspection by the user 4. Thanks to sensual perception the user 4 performs the sensual inspection and checks if:

the event depicted in the confirmation event data C-ED, that contains the incorporated transferred hash code THC, matches the event depicted in the source event data S-ED, the transferred hash code THC incorporated into realm of the source event SE (the transferred hash code THC recognizable in the physical context of the confirmation event CE) matches the transferred hash code THC that was retrieved from the digital witness DW 203

The verification process is successfully completed if, according to the sensual inspection of the user, the source event data S-ED and the confirmation event data C-ED depict the same actual event AE and if the transferred hash code THC incorporated into the realm of the source event SE matches the transferred hash code THC stored in the digital witness DW 203.

If the verification process is successful, the link between the source event SE depicted in the source event data S-ED and the time of the source event SE occurrence, is confirmed, the time being contained in the timestamp of the source data S-D.

The sensual verification of the event depicted in the S-ED and the C-ED is completed by the system 400 of the user 4, thanks to his or her sensual perception but not obligatory. In another embodiment fully automated system 400 with AI (or similar) algorithms can be used. As mentioned before, in case of event data ED acquired in a continuous mode, if continuity of the recorded scene was preserved, there is an additional possibility of determining the exact time of all events occurring before and after the incorporation of the transferred hash code THC into the realm of the source event SE.

To perform the method of verification of verification of the digital representation of the actual event bound with the real time of its occurrence the system 400 of the user 4 (as mentioned earlier) is required. The system 400 (not shown) for verification of the digital representation of the actual event bound with the real time of its occurrence comprises means configured to connect with a system 200 comprising digital witness DW 203 and to retrieve verification data VD.

If only one file is retrieved (the C-ED contains the S-ED), the system 400 of the user 4 must be able to extract the source event data S-ED from the confirmation event data C-ED, basing on the size of the source event data S-ED that is stored in the digital witness DW 203 or elsewhere. If the information about the size of the source event data is missing the system 400 of the user 4 can theoretically apply a time-consuming "brute-force" method to determine the size of the source event data S-ED and to extract it from the confirmation event data C-ED.

If the source data S-D is not equal to the source event data S-ED and its corresponding source event data S-ED is stored elsewhere that in the digital witness DW 203, the system 400 of the user 4 should be configured to locally recalculate out of the source event data S-ED, the source data S-D, according to the information contained in the verification data VD. or to upload the source event data S-ED to the system 200 let the system 200 perform said recalculation of the source data S-D according to the information contained in the verification data VD.

If the confirmation data C-D is not equal to the confirmation event data C-ED and its corresponding confirmation event data C-ED is stored elsewhere that in the digital witness DW 203, the process run in the same way as in the case of the source data S-D, described above.

Once the data retrieved from system 200 were proven consistent, the next step of the verification process can be performed, the step being sensual verification.

Using sensual perception user 4 can sensually compare the event depicted in the event data ED acquired before and after the incorporation of a transferred hash code THC into the realm of the source event SE. The same can be performed in an automated way if artificial intelligence algorithms are implemented in the system 400 on the user's side. If the source event data S-ED and the confirmation event data C-ED represent the same actual event AE, and the transferred hash code THC recognizable in the confirmation event data C-ED matches the one that is saved in the immutable database 203 (the digital witness DW 203), there is a certainty that the actual event AE depicted in the source event data S-ED occurred in a time indicated by the timestamp of the source data S-D, being a representation of the source event data S-ED.

The system 400 (not shown) of the user 4 should enable the user 4 to use sensual perception (e.g. sight or hearing: to sensually (e.g. visually, aurally) compare the event depicted in the source event data S-ED with the event depicted in the confirmation event C-ED, in order to determine their similarity, and additionally, in case of event data ED acquired in a continuous mode, their continuity, to check if the transferred hash code THC recognizable in the event depicted in the confirmation event data C-ED (i.e, the transferred hash code THC incorporated into the realm of the source event SE) matches the transferred hash code THC retrieved from the digital witness DW 203; if the user 4 is human this process can be performed sensually (for example, visually or aurally).

If the user 4 is a human the actions mentioned above, especially all interactions with system 200 comprising the digital witness DW 203 and all calculations/recalculations can be accomplished with the help of a computer program, for example a mobile application 410 (not shown).

Now several examples of the use of the methods and systems according to the invention will be given.

Example 1—Single Mode Digital Registration without Calculating a Fingerprint of Event Data In one of the possible embodiments of the invention, the method of binding the digital representation of an actual event with the real time of its occurrence concerns an event registered in a single mode, and comprises sending to the system 200 the full event data. The system 200 comprises the digital witness DW 203. In this embodiment the method comprises following steps:

(1) A human, acting as the creator 1, wants to confirm the real time of the occurrence of an actual event and chooses to use a public (open) system 200, that uses only one public (open) hash function HF-SHA-2—for all hashing purposes. The data describing the state of the digital witness DW 203 is a fingerprint of all data stored in the digital witness DW 203 prior to the moment of obtaining the source data S-D. The system 200 as the source 300 of time for all purposes uses the internet "actual time" service available under the internet address, "http://time.is" that is trusted by the human. The transferred hash code THC generated by the system 200 is equal to the hash code HC. A dedicated application 110 installed on a human's smartphone 100 provides communication with the system 200.

(2) The human acquires with the smartphone 100 a source event data S-ED of a source event SE, as a photo.

(3) The source data S-D being the source event data S-ED is sent to the system 200 by the application 110.

(4) The system 200 calculates the data describing its state using SHA-2 hash function, records the source data S-D into the digital witness DW 203, and immediately afterwards acquires and records into a digital witness DW 203 a timestamp for the source data S-D.

(5) The system 200 uses the SHA-2 hash function to calculate a hash code HC using following components: (1) the data describing the state of the digital witness DW 203, (2) the source data S-D and (3) the timestamp of the source data S-D.

(6) The system 200 records the hash code HC into the digital witness DW 203. The transferred hash code THC, that is equal to the hash code HC, is transferred back by the system 200 to the human's smartphone 100 and displayed on the screen of the smartphone 100.

(7) The human incorporates the transferred hash code THC into the realm of the source event SE by writing the transferred hash code THC on a piece of paper and then placing the piece of paper into the context of the source event in order to create a confirmation event CE.

(8) The human acquires the confirmation event data C-ED of the confirmation event CE as a photo with the smartphone 100. This photo should be as similar as possible to the source event SE photo, and the piece of paper containing the transferred hash code THC should be recognizable, visible and legible within the frame of this photo.

(9) The confirmation data C-D, being the confirmation event data C-ED is sent to the system 200 by the application 110.

(10) The system 200 records the confirmation data C-D into the digital witness DW 203 and immediately acquires and records into the digital witness DW 203 a timestamp for the confirmation event data C-ED

(11) The system 200 uses the SHA-2 hash function to calculate a confirmation hash code CHC using following components: (1) the confirmation data C-D, (2) the timestamp of the confirmation data C-D, and (3) the hash code HC.

(12) The system 200 records the confirmation hash code CHC into the digital witness DW 203

(13) The proof of event occurrence POEO, containing the timestamp of the source event data S-ED, the hash code HC, the timestamp of the confirmation event data C-ED, the confirmation hash code CHC, the information about used hash functions HFs (SHA-2) and the name of the digital witness DW 203 with the address of the record related to the stored data, is transferred back by the system 200 to the human's smartphone application 110, displayed on the screen of the smartphone 100 and saved locally by the application 110.

The procedure of binding the real-time timestamp with the source event SE is finished.

Now a corresponding example of verification process for the first case with single mode digital representation will be described.

(1) A human, acting as the user 4, wants to check when the event occurred. He obtained from the creator 1 the proof of event occurrence POEO that contains the information about the precise time of the event occurrence (being a timestamp of the source event data S-ED) and the information about accessing the digital witness DW 203 (a web address of the interface of the system 200) that stores the information about the event of interest. The system 200 comprising a digital witness DW 203 uses a web interface to communicate. The human acting as the user 4 uses the system 400.

(2) the smartphone 400 connects the human with the webpage of the system 200 and queries for an event that occurred in the time specified by the timestamp contained in the proof of the event occurrence POEO.

(3) If the query is found, the data describing the state of the digital witness DW 203, the hash code HC and the confirmation hash code CHC are recalculated using SHA-2 hash function HF, by the system 200, to check for the data consistency. If the consistency is preserved, the transferred hash code THC, the source data S-D, the confirmation data C-D and the timestamp of the source data S-D are displayed on the webpage (note: the source data S-D and the confirmation data C-D are the photos).

(4) The human has to visually compare the event depicted in the source data S-D with the event depicted in the confirmation data C-D. If the human decides that the source data S-D and the confirmation data C-D depict the same actual event, the verification proceeds.

(5) The human has to check if the transferred hash code THC visible in the realm of the confirmation data C-D is the same as the transferred hash code THC displayed on the webpage. If both transferred hash codes THCs match, the time of the occurrence of the event depicted in the source data S-D, is contained in the timestamp of the source data S-D and the verification is successful.

Example 2—Single Mode Digital Registration with Calculation of a Fingerprint of Event Data In another of the possible embodiments of the invention, the method of binding the digital representation of an actual event AE with the real time of its occurrence concerns an event registered in a single mode, and comprises sending to the system 200 only the fingerprints of the full event data (whereas the full event data are stored locally by the creator 1. The system 200 comprises the digital witness DW 203. In this embodiment the method comprises following steps:

(1) A human, acting as the creator 1, wants to confirm the real time of the occurrence of an actual event and chooses to use a public (open) system 200, that uses by default only one public (open) hash function HF SHA-2 for all hashing purposes, including the calculation of the fingerprints. The data describing the state of the digital witness DW 203 is a fingerprint of all data stored in the digital witness DW 203 prior to the moment of obtaining the source data S-D. The system 200 as a source of the time 300 for all purposes uses the internet "actual time" service available under the internet address "http://time.is", that is trusted by the human. The transferred hash code THC generated by the system 200 is equal to the hash code HC. The system 200 offers different hash functions HFs to calculate fingerprints. The human chooses a non-standard SHA-3 hash function HF for calculating a fingerprint of a source event data S-ED and a fingerprint of a confirmation event data C-ED. The human chooses, in the system 200, the option of storing additional information, namely the significant hash function input data SHFID together with each calculated fingerprint, said significant hash function input data SHFID value being equal to the size of the input data of the hash function HF that calculates each fingerprint. A dedicated application 110 installed on a human's smartphone 100 provides communication with the system 200 (comprising a digital witness DW 203) and has a built-in hash function HF SHA-3 to perform local calculations.

(2) The human acquires with the smartphone 100 a source event data S-ED of a source event SE as a photo. The source event data S-ED are stored locally by the application 100.

(3) The source data S-D is equal to a fingerprint of the source event data S-ED, that is calculated locally on the smartphone 100 using SHA-3 function built into the smartphone application 110. The significant hash function input data SHFID is set to be equal to the size of the source event data S-ED. The information about the hash function HF used to calculate said fingerprint (referring to the SHA-3 method) as well as the information about the method used to generate the significant hash function input data SHFID is sent to the system 200 by the application 110, and stored by the system 200 in the digital witness DW 203.

(4) The source data S-D and the significant hash function input data SHFID is sent to the system 200 by the application 110 of the smartphone 100.

(5) The system 200 records the source data S-D and the significant hash function input data SHFID into the digital witness DW 203, and immediately afterwards acquires and records into the digital witness DW 203 a timestamp for the source-data S-D.

(6) The system 200 comprising uses the SHA-2 hash function HF to calculate its state, and the same function to calculate a hash code HC using following components: (1) the data describing the state of the digital witness DW 203, (2) the source data S-D and (3) the timestamp of the source data S-D.

(7) The system 200 records the hash code HC into the digital witness DW 203. The transferred hash code THC, that is equal to the hash code HC is transferred back to the human's smartphone 100 and displayed on its screen.

(8) The human incorporates the transferred hash code THC into the realm of the source event SE by writing the transferred hash code THC on a piece of paper and then placing it into the context of the source event SE in order to create a confirmation event CE.

(9) The human using smartphone 100 acquires the confirmation event data C-ED of the confirmation event CE as a photo. This photo should be as similar as possible to the source photo, and the piece of paper containing the transferred hash code THC should be recognizable, visible and legible within the frame of this photo. The confirmation event data C-ED is stored locally by the application 110.

(10) The confirmation data C-D is equal to a fingerprint of the confirmation event data C-ED, that is calculated locally on the smartphone 100 using SHA-3 function built into the smartphone application 110. The significant hash function input data SHFID is set to be equal to the size of the confirmation event data C-ED. The information about the hash function HF used to calculate said fingerprint (referring to the SHA-3 method) as well as the information about the method used to generate the significant hash function input data SHFID is sent to the system 200 by the application 110, and additionally stored by the system 200 in the digital witness DW 203.

(11) The confirmation data C-D and the significant hash function input data SHFID is sent to the system 200 by the application 110.

(12) The system 200 records the confirmation data C-D and its SHFID into the digital witness DW 203 and immediately afterwards acquires and records into the digital witness DW 203 a timestamp for the confirmation data C-D.

(13) The system 200 uses the SHA-2 hash function HF to calculate a confirmation hash code CHC using following components: (1) the confirmation data C-D, (2) the timestamp of the confirmation data C-D, and (3) the hash code HC.

(14) The system 200 records the confirmation hash code CHC into the digital witness DW 203. The proof of event occurrence POEO containing: the source data S-D with its significant hash function input data SHFID (note: the source data S-D is the fingerprint), the timestamp of the source data S-D, the hash code HC, the confirmation data C-D with its significant hash function input data SHFID (note: the confirmation data C-D is the fingerprint), the timestamp of the confirmation data C-D, the confirmation hash code CHC, the information about used hash functions (namely, the SHA-3 for both fingerprints and the SHA-2 for the hash code HC, the confirmation hash code CHC and the data describing the state of the digital witness DW 203), as well as the name of the digital witness DW 203 with the address of the record related to the stored data, is transferred back to the human's smartphone application 110, displayed on the screen of the smartphone 100, and saved locally by the application 110.

The procedure of binding the real-time timestamp with the source event is finished.

Now a corresponding example of verification process for the second case with single mode digital representation will be described.

(1) A human, acting as the user, using system 400, wants to check when the event occurred. He obtained from the creator 1 the source event data S-ED, the confirmation event data C-ED, the proof of event occurrence POEO that contains the information about the hash function HF used to calculate the source data S-D and the confirmation data C-D, being fingerprints calculated using SHA-3 hash function HF, and the information on how to access the digital witness DW 203 that stores the information about the event. The system 200 (comprising digital witness DW 203) uses a web interface to communicate. The system 200 contains all information about calculating the source data S-D and confirmation data C-D, including hash functions HFs that were used by the creator. (Note that the creator 1 does not have to remember the exact time of the event occurrence). The user 4 will is to use the system 200 to perform all the recalculations necessary in the verification process. The human acting as the user 4 uses the system 400.

(2) The human has to visually compare the event depicted in the source event data S-ED with the event depicted in the confirmation event data C-ED. If, according to this comparison, they represent the same actual event, the verification proceeds.

(3) The human goes to the said webpage being interface of the system 200, uploads using the smartphone 400, the source event data S-ED and the confirmation event data C-ED into the digital witness DW 203 to let it recalculate their fingerprints with their SHFIDs.

(4) The system 200 retrieves the information about the method used to calculate the fingerprints, being in this example the SHA-3 hash function HF, and retrieves the information about the information about generation of the significant hash function input data SHFID, that in this example is generated by assigning to it the size of the input data of each hash function HF used to calculate a fingerprint.

(5) The system 200 sets the significant hash function input data SHFID of the source data S-D to be equal to the length of the uploaded source event data S-ED.

(6) The system 200 sets the significant hash function input data SHFID of the confirmation data C-D to be equal to the length of the uploaded confirmation event data C-ED.

(7) Using the uploaded source event data S-ED and confirmation data C-ED the system 200 recalculates with the SHA-3 hash function HF the source data S-D and the confirmation data C-D respectively (note: the source data S-D and the confirmation data C-D are fingerprints of the full corresponding event data)

(8) The system 200 searches the digital witness DW 203 for the recalculated source data S-D, confirmation data C-D and their corresponding significant hash function input data SHFIDs. If the data are found (which means that they are equal to those already saved in the digital witness DW 203), the verification proceeds.

(9) For the purpose of checking the data consistency, the SHA-2 function is used by the system 200 to recalculate the data describing the state of the digital witness DW 203, the hash code HC, and the confirmation hash code CHC. If these data are consistent, the transferred hash code THC and the timestamp of the source data S-D are retrieved from the digital witness DW 203 and displayed to the user 4 on the smartphone 400.

(10) If the transferred hash code THC retrieved by the system 200 from the digital witness DW 203 matches the transferred hash code THC incorporated into the realm of the SE depicted in the confirmation event data C-ED, the user 4 can be sure that the source event depicted in the source event data S-ED, occurred in the time indicated by the timestamp of the source data S-D. The verification is successful.

Example 3—Continuous Mode Digital Representation without Calculating a Fingerprint of Event Data In another of the possible embodiments of the invention, the method of binding the digital representation of an actual event with the real time of its occurrence concerns an event registered in a continuous mode, and comprises sending to the system 200 the full event data. The system 200 comprises the digital witness DW 203. In this embodiment the method comprises following steps:

(1) A human, acting as the creator 1, wants to confirm the real time of its occurrence of an actual event and chooses to use a public (open) system 200 that uses only one public (open) hash function HF-SHA-2 for all hashing purposes. The data describing the state of the digital witness DW 203 is a fingerprint of all data stored in the digital witness DW 203 prior to the moment of obtaining the source data S-D. The system 200 as a source of time 300 for all purposes uses the internet "actual time" service available under the internet address "http://time.is", that is trusted by the human. The representation of the hash code HC, namely the transferred hash code THC is generated by the system 200 is a digest of the hash code HC obtained according to the method described in RFC4226 (by Internet Engineering Task Force). A dedicated application installed on a human's smartphone 100 provides communication with the system 200. The application 110 acts in a way that the event data acquired during initial five seconds of a continuous event data acquisition is considered a source event data S-ED. This time of registering the source event data S-ED in the system 200 after five seconds of continuous recording is a general rule of the system 200.

(2) The human starts to record the video with the smartphone 100. After five seconds the already acquired event data are considered the source event data S-ED. The event data acquisition is uninterrupted.

(3) The source data S-D, being the source event data S-ED, are sent to the system 200 by the smartphone's application 110.

(4) The system 200 calculates the data describing the state of the digital witness DW 203 (using SHA-2 hash function HF).

(5) The system 200 acquires and records into the digital witness DW 203, a timestamp of the source data S-D.

(6) With the same hash function HF, the system 200 calculates a hash code HC using following components: (1) the previously calculated data describing the state of the digital witness DW 203, (2) the source data S-D and (3) the timestamp of the source data S-D (7) The system records a hash code HC into the digital witness DW 203. The transferred hash code THC, that is generated basing on the method according to the RFC4226 and is transferred back to the human's smartphone 100 and displayed on its screen.

(8) The human, without interrupting the event data acquisition, incorporates the transferred hash code THC into the realm of the documented event by handwriting and reading loudly the transferred hash code; the whole process of the handwriting and reading loudly the transferred hash code THC is recorded in the event data being acquired.

(9) Once the human finishes event data acquisition, all recorded data create the confirmation event data C-ED.

(10) The confirmation data C-D, being the confirmation event data C-ED. The confirmation event data C-ED is sent to the system 200 by the smartphone's application 110.

(11) The system 200 records the confirmation data C-D into the digital witness DW 203 and immediately acquires and records into the digital witness DW 203 a timestamp for the confirmation data C-D.

(12) The system 200 uses the SHA-2 hash function HF to calculate a confirmation hash code CHC using following components: (1) the confirmation data C-D, (2) the timestamp of the confirmation data C-D, and (3) the hash code HC.

(13) The system 200 records the confirmation hash code CHC is into the digital witness DW 203. The proof of event occurrence POEO containing the timestamp of the source data S-D and the confirmation data C-D, S-TS, the hash code HC, the C-TS, the confirmation hash code CHC, the information about used hash functions (SHA-2) and the name of the digital witness DW 203 with the address of the record related to the stored data, is transferred, by the system 200, back to the human's smartphone application 110, displayed on the screen of the smartphone 100 and saved locally said application 110.

The procedure of binding the real-time timestamp with the source event is finished.

Now a corresponding example of verification process for the first case with continuous mode digital representation will be described.

1) A human, acting as the user 4, wants to check when the event occurred. He obtained from the creator 1 the proof of event occurrence POEO that contains the precise time of the event occurrence (contained in the timestamp of the source data S-D) and the information on how to access the digital witness DW 203 that stores the information about the event. The system 200 (comprising the digital witness DW 203) uses the web interface to communicate. The human acting as the user 4 uses the system 400.

2) The human using system 400 enters the webpage of the system 200 and queries for the event that occurred in the time contained in the timestamp of the source data S-D, provided in the proof of event occurrence POEO.

3) If queried information is found by the system 200, the information about the event, the system 200 recalculates using SHA-2 hash function: the state of the digital witness DW 203, the hash code HC and the confirmation hash code CHC, to check for the data consistency. If these data are consistent, the transferred hash code THC is calculated (using method according RFC4226) out of the hash code HC. Further, the transferred hash code THC, the source data S-D, the confirmation data C-D and the timestamp of the source data S-D is displayed on the website (note: the confirmation data C-D is a continuous video recording, hence the source data S-D, according to the general rule of the system 200, is first five seconds of the confirmation data C-D).

4) The human has to sensually compare the event depicted in the source data S-D with the event depicted in the confirmation data C-D. For this purpose, watching only confirmation data C-D is sufficient (according to the general rule of system 200, the source data S-D is the first five seconds of the confirmation data C-D). If, according to this comparison, they represent the same actual event, the human has to compare the transferred hash code THC transferred into the realm of the S-E with the transferred hash code THC retrieved from the system 200. If both transferred hash codes THCs match, the time of the occurrence of the event recorded in the source data S-D is indicated by the timestamp of the source data S-D. The verification process is completed.

5) As long as the continuity of the recording is preserved, the real time of all events contained in the confirmation data C-D can be determined (including events that occurred prior to and after the incorporation of the transferred hash code THC into the realm of the source event SE.

Example 4—Continuous Mode Digital Representation with Calculating a Fingerprint of Event Data In another of the possible embodiments of the invention, the method of binding the digital representation of an actual event with the real time of its occurrence concerns an event registered in a continuous mode, and comprises sending to the system 200 only the fingerprints of the full event data. The system 200 comprises the digital witness DW 203. The full event data are stored locally in a single file, being a confirmation event data C-ED that contains a source event data S-ED. In this embodiment the method comprises following steps:

1) A human, acting as the creator 1, wants to confirm the real time of the occurrence of an actual event and chooses to use a public (open) system 200, that uses by default only one public (open) hash function HF SHA-2 for all hashing purposes, including the calculation of the fingerprints. The state of the digital witness DW 203 is a finerprint of all data stored in the digital witness DW 203 prior to the moment of obtaining the source data S-D. The system 200 as a source of the time 300 for all purposes uses the internet "actual time" service available under the internet address "http://time.is", that is trusted by the human. The transferred hash code THC generated by the system 200 is equal to the hash code HC. The system 200 offers different hash functions HFs to calculate fingerprints. The human chooses the SHA-3 hash function HF for both fingerprints (for the source event data S-ED, and the confirmation event data C-ED). The human chooses, in the system 200, the option of storing the significant hash function input data SHFID together with each calculated fingerprint, and the value of the significant hash function input data SHFID is defined as the size of the input data of the hash function HF that calculates a fingerprint. A dedicated application 110 installed on human's smartphone 100 provides communication with the system 200 and has built-in hash functions HFs to perform the local calculations. The said application 110 acts in a way that the event data that are source event data are acquired on demand, during continuous event data acquisition.
2) The human starts to record the video of a source event with the smartphone 100. When appropriate, the user, using application, on demand, creates a source data S-D. The event data acquisition is uninterrupted.
3) The source data S-D is equal to a finerprint of the already recorded source event data S-ED. Said fingerprint is calculated locally on the smartphone 100, using the SHA-3 function built into the application. The significant hash function input data SHFID is set to be equal to the size of the source event data S-ED. The information about the hash function HF used to calculate the fingerprint of the source event data S-ED (that is the SHA-3 hash function HF) and the information about the method used to generate the SHFID is sent to the system 200 by the application 110, and additionally stored in the digital witness DW 203.
4) The source data S-D, and its SHFID is sent to the system 200 by the smartphone's 100 application 110.
5) The system 200 calculates the data describing the state of the digital witness DW 203 using SHA-2 hash function HF, and records into the digital witness DW 203 both the source data S-D and its SHFID.
6) Immediately afterwards the system 200 acquires and records into the digital witness 203 a timestamp for the source data S-D.
7) The system 200 uses the SHA-2 hash function HF to generate a hash code HC using following components: (1) the data describing the state of the digital witness DW 203, (2) the source data S-D and (3) the timestamp of the source data S-D.
8) The system 200 records the hash code HC is into the digital witness DW 203. The transferred hash code THC, that is equal to the hash code HC is transferred back by the system 200 to the human's smartphone 100 and displayed on its screen.
9) The human, without interrupting the event data acquisition, incorporates the transferred hash code THC into the realm of the documented event, by writing the transferred hash code THC on a piece of paper and reading it loudly; the whole process of handwriting and reading loudly the transferred hash code THC is recorded by the smartphone 100 in the event data being acquired.
10) Once the human finishes event data acquisition, all recorded data create the confirmation event data C-ED. The confirmation event data C-ED is stored locally in the memory of the smartphone 100.
11) The confirmation data C-D is a fingerprint of the confirmation event data C-ED that his calculated locally on the smartphone 100, using the SHA-3 function built into the dedicated application 110. The significant hash function input data SHFID is set to the equal to the size of the confirmation event data C-ED. The information about the hash function HF used to generate the fingerprint (that is the SHA-3 hash function HF) and the information about the method used to generate the fingerprint of the confirmation evend data C-ED is sent to the system 200 by the application 110, and additionally stored in the digital witness DW 203.
12) The confirmation data C-D and its SHFID is sent to the system 200 by the application 110.
13) The system 200 records the confirmation data C-D and its SHFID into the digital witness DW 203 and immediately afterwards acquires and records into the digital witness DW 203, a timestamp for the confirmation data C-D.
14) The system 200 uses the SHA-2 hash function HF to generate a confirmation hash code CHC using following components: (1) the confirmation data C-D (2) the timestamp of the confirmation data C-D and (3) the hash code HC.
15) The confirmation hash code CHC is recorded by the system 200 into the digital witness DW 203. The proof of event occurrence POEO, containing the source data S-D with its timestamp and significant hash function input data SHFID, the hash code HC. the confirmation data C-D with its timestamp and significant hash function input data SHFID, the information about used hash functions (the SHA-3 for the source data S-D and confirmation data C-D (both being fingerprints), and the SHA-2 for the hash code HC, the confirmation hash code CHC and the data describing the state of the digital witness DW 203), and the name of the digital witness DW 203 with the address of the record related to the stored data, is transferred back to the human's smartphone application 110, displayed on the screen of the smartphone 100 and saved locally by the smartphone application 110.

The procedure of binding the real-time timestamp with the source event is finished.

Now a corresponding example of verification process for the second case with continuous mode digital representation will be described.

1) A human, acting as the user 4 wants to check when the event occurred. He obtained from the creator 1 the confirmation event data C-ED and corresponding proof of event occurrence POEO (generated according to the method described in this example). The user 4 have also the information about accessing the system 200 (comprising the digital witness DW 203) that keeps the information about the event. The system 200 uses a web interface to communicate. The system 200 contains all hash functions HFs that were used by the creator. (Note that the creator 1 does not have to remember the exact time of the event occurrence). The human acting as the user 4 uses the system 400.

2) The source event data S-ED is extracted using smartphone 400 from the confirmation event data C-ED according to the information about its size stored in the significant hash function input data SHFID of the source data S-D. The fingerprint of the source data S-D is locally recalculated from the S-ED and the confirmation data C-D is locally recalculated from the confirmation event data C-ED. These local recalculations are performed by the dedicated smartphone's 400 application that is capable of calculating the SHA-3 based hashes.

3) The system 200 searches the digital witness DW 203 is for recalculated source data S-D and confirmation data C-D with their significant hash function input data SHFIDs. If queried data are found (i.e. recalculated data match those that are stored in the digital witness DW 203) the verification proceeds.

4) The system 200 recalculates the data describing the state of the digital witness DW 203, the hash code HC and the confirmation hash code CHC using SHA-2 hash function HF in order to check for data consistency. If these data are consistent, the transferred hash code THC and the timestamp of the source data S-D are retrieved from the digital witness DW 203 and displayed on the webpage by the smartphone 400.

5) The human has to visually compare the event depicted in the S-ED with the event depicted in the confirmation event data C-ED. If, according to this comparison, they represent the same actual event, the human has to compare the transferred hash code THC transferred into the realm of the source event SE with the transferred hash code THC retrieved from the digital witness DW 203. If both transferred hash codes THCs match, the time of the event occurrence depicted in the source event data S-ED is indicated by the time contained in the time tamp of the source data S-D. The verification is completed.

6) As long as the continuity of the recording is preserved, the real time of all events contained in the C-ED can be determined (including the time of the events that occurred prior to and after the incorporation of the transferred hash code THC into realm of the source event SE).

7) Note that the source event data S-ED and the confirmation event data C-ED is a movie, so in the case of source event data S-ED being a part of a confirmation event data C-ED, watching only one movie, namely the confirmation event data C-ED is sufficient.

Now, final comments to the invention will be provided. The method according to the invention requires the event data (both the source event data S-ED and the confirmation event data C-ED) to be reliable if they are to have a practical use. The event data must be considered reliable at least both by the creator 1 and the user.

The "reliability of event data" refers to the three aspects described below.

1) Event Data Modification

A constant technological development allows heavy event data modification, including live changes to the event data being acquired, such as adding backgrounds, adding changes to the face or the head of a person depicted in the event data (for example a top hat, puppy ears, etc.). Probably the heaviest event data modification is a live video streaming of a digitally generated, lip-synced face instead of the impersonator's face. However, none of these modifications is an issue for the reliability of event data, as long as the creator 1 wants to get reliable event data. This is because the manipulation of the event data is only digital (virtual), thus it does not change the realm of the actual event and it does not have the property of a physical interaction.

Therefore, in order to prove that some detail of interest depicted in the event data is not a result of a digital modification, it is sufficient to prove that this detail physically exists, by effectuating a physical interaction with this very detail. For example, if a person present in the realm of an actual event depicted by an event data wears a top-hat that is suspected to be added digitally, in order to prove that this top-hat actually exists he or she should show some physical interaction with this top-hat in the moment of acquiring the event data.

The same applies if someone who is watching an event data depicting a talking person suspects that the live streaming being watched is a digitally generated lip-synced face, not someone's real face. In this case, to prove that the face of the person is real (not virtual, digitally created), the person present in the realm of the actual event should present some physical interaction with his or her face, like touching the face with a finger or any other activity that will confirm the physical (not virtual) nature of the reality depicted in the event data.

Even in a case of event data being photos, that are only snapshots of an actual event (in opposition to continuous video recordings), and that can be potential subjects for easy and heavy digital manipulation, there is a possibility of acquiring a reliable event data, for example by taking multiple photos of the same event and/or showing in those photos some physical interactions with the physical realm depicted therein.

Bearing in mind the above, if the creator 1 s will is to acquire reliable event data, he or she should care about physically interacting with each detail of the event data that might potentially be later questioned or challenged by the user. Another solution is to acquire multiple event data of the same actual event. This is particularly important in case of acquiring the event data in a single mode (e.g. as a photo), to avoid unclear situations.

2) The Quality of the Event Data

The technical parameters of acquired event data should provide a quality that allow depicting an actual event with all details that might be interesting for the creator 1 and/or the user. For example, if the event data is a video, it should have such a quality, resolution, frame-per-second rate and size, to provide the depiction of the actual event satisfactory (sufficient), preferably both for the creator 1 and the user.

The event data acquired in a continuous mode should have continuity preserved, i.e. the video should not contain consequent under- or overexposed frames, should not be blurred, should not contain the noise, etc.

Although in some situations even a low-quality event data may be significant for both creator 1 and/or user 4 (for example the photos or videos captured in bad light conditions, but in some unique circumstances), if this event data is intended to be used in the legal proceeding (for example as a proof before a court of law), it should meet the highest and the most up-to-date quality standards possible.

3) Event Data that do not Contain the Information Sufficient to Depict the Actual Event Some event data, despite their high quality are insufficient to depict the actual event.

This can happen if the event data do not contain the details that can be precepted with human senses. This may happen if someone acquires an event data of a plain, ideally smooth surface, enlightened with the artificial light or uses such a surface as the background. However, even in this demanding condition there is a possibility of acquiring reliable event data. This can be accomplished for example by: acquiring the event data in a continuous mode with preserved continuity and adding to the actual event some content that will be recognizable by the human senses (such a content can be for example, the face of the creator), using the device with such a zoom or a resolution that will expose more recognizable details.

All the requirements described above and related to the reliability of the event data are the same as the requirements for the event data that have been commonly used so far and considered as reliably depicting actual events in everyday situations and during the trial or litigation (for example, as a proof in a court proceeding).

The invention claimed is:

1. A method of generating a digital representation of an actual event bound with the real time of the occurrence of said actual event comprising:
    acquiring, using at least one of a camera or a microphone, a source event data S-ED of an actual source event SE that is to be digitally documented,
    sending a source data S-D, being a representation of the source event data S-ED, to an immutable database for registration and timestamping,
    receiving in real time a representation of a hash code HC calculated using a hash function having as input at least: the source data S-D, a timestamp of the source data S-D acquired at time of reception of the source data S-D by the immutable database, and data describing a state of said immutable database at the time of the timestamp of the source data S-D,
    physical presenting said representation of the hash code HC for sensual perception,
    incorporating said representation of the hash code HC into a realm of the source event SE so as to create a confirmation event CE that binds the source event SE and the hash code HC,
    acquiring a confirmation event data C-ED of the confirmation event CE, the confirmation event CE being a modified actual source event SE, and
    sending a confirmation data C-D, being a representation of the confirmation event data C-ED, to the immutable database for registration and timestamping so as to provide a confirmation of incorporation of the hash code HC into the source event SE.

2. The method according to claim 1, wherein the source data S-D, is equal to the source event data S-ED and the confirmation data C-D is equal the confirmation event data C-ED.

3. The method according to claim 1, wherein the source data S-D, is not equal to the source event data S-ED and/or the confirmation data C-D is not equal the confirmation event data C-ED, while the source event data S-ED and/or the confirmation event data C-ED corresponding to the source data S-D and/or the confirmation data C-D are sent for storage outside the immutable database.

4. The method according to claim 3, wherein information about process of generation of the source data S-D and/or the confirmation data C-D are sent for storage in the immutable database.

5. The method according to claim 3, wherein information about process of generation of the source data S-D and/or the confirmation data C-D are sent for storage outside the immutable database.

6. The method according to claim 1, further comprising receiving from the immutable database a confirmation of storing the source-data S-D and/or the confirmation data C-D, optionally with corresponding timestamps of the source-data S-D and/or the confirmation data C-D and the hash code HC.

7. A computer program product embodied on a non-transitory computer readable memory comprising instructions which, when executed by a computer, causes the computer to perform the method according to claim 1.

8. The method of providing data for verification of the digital representation bound with the real time of its occurrence comprising:
    receiving a query about verification data VD concerning an actual event of interest being bound with the real time of its occurrence and generated by the method according to claim 1,
    checking whether the verification data VD concerning said actual event of interest exist in an immutable database being queried, and
    sending the queried verification data VD concerning said actual event of interest.

9. The method according to claim 8, further comprising checking consistency of said verification data VD concerning said actual event of interest by recalculating at least a hash code HC unquestionably certifying the time of occurrence of the event of interest.

10. The method of verification of the digital representation bound with the real time of its occurrence comprising:
    retrieving from an immutable database verification data VD concerning the actual event of interest, generated by the method according to claim 1, said verification data VD being at least: a representation of the hash code HC, the source data S-D and the confirmation data C-D,
    finding the representation of the hash code HC within a context of an actual event registered as confirmation event data C-ED using AI, and
    comparing a source event SE registered represented by the source data S-D and a confirmation event CE represented by the confirmation data C-D using AI.

11. A computer program product embodied on a non-transitory computer readable memory comprising instructions which, when executed by a computer, causes the computer to perform the method according to claim 10.

12. A system for generating a digital representation of an actual event bound with the real time of the occurrence of said actual event comprising:

a digital registration input device configured to acquire a source event data S-ED of an actual source event SE that is to be digitally documented, a communication device configured to send a source data S-D, being a representation of the source event data S-ED, to an immutable database for registration and timestamping, and configured to receive in real time a representation of a hash code HC calculated using a hash function having as input at least: the source data S-D, a timestamp of the source data S-D acquired at time of reception of the source data S-D by the immutable database, and data describing a state of said immutable database at the time of the timestamp of the source data S-D, a presentation output device for physical presenting said representation of the hash code HC for sensual perception to incorporate said representation of the hash code HC into a realm of the source event SE so as to create a confirmation event CE, the digital registration input device being further configured to acquire a confirmation event data C-ED of the confirmation event CE that binds the source event SE and the hash code HC, the confirmation event CE being a modified actual source event SE, and wherein the communication device is further configured to send a confirmation data C-D, being a representation of the confirmation event data C-ED, to the immutable database for their registration and timestamping so as to provide a confirmation of incorporation of the hash code HC into the source event SE, the confirmation data C-D being the representation of the confirmation event data C-ED.

13. The system according to claim 12, further comprising a user interface enabling interaction with the system.

14. A method of providing time certification of the digital representation of an actual event bound with the real time of the occurrence of said actual event comprising:

receiving a source data S-D being the representation of a source event data S-ED of an actual source event SE that is to be digitally documented from at least one of a camera or a microphone, storing the source data S-D in an immutable database, timestamping in real time the source data S-D with a real time timestamp acquired from a trusted source, storing the real time timestamp of the source data S-D in the immutable database, determining a state of the immutable database at a particular time indicated by the real time timestamp of the source data S-D, calculating a hash code HC using a hash function having as input at least: the source data S-D, the real time timestamp of the source data S-D, and data describing the determined state of said immutable database, sending in real time a representation of the hash code HC for incorporation into a realm of the actual source event SE, receiving a confirmation data C-D being a representation of a confirmation event data SC-ED of a confirmation event CE, the confirmation event CE being the source event SE comprising additionally physically incorporated representation of the hash code HC into its realm, storing a confirmation data C-D into the immutable database, timestamping in real time the confirmation data C-D with a timestamp acquired from a trusted source, and storing the real time timestamp of the confirmation data C-D in the immutable database.

15. The method according to claim 14, further comprising storing in said immutable database the hash code HC.

16. The method according to claim 14, further comprising storing in said immutable database the representation of the hash code HC.

17. The method according to claim 14, further comprising calculating and storing in the immutable database a confirmation hash code CHC calculated using hash function having as input the confirmation data C-D, the timestamp of the confirmation data C-D, and the hash code HC.

18. The method according to claim 14, wherein the source data S-D, is equal to the source event data S-ED and the confirmation data C-D is equal the confirmation event data C-ED.

19. The method according to claim 14, wherein the source data S-D is not equal to the source event data S-ED and/or the confirmation data C-D is not equal the confirmation event data C-ED, while the source event data S-ED and/or the confirmation event data C-ED corresponding to the source data S-D and/or the confirmation data C-D are received for storage outside the immutable database.

20. The method according to claim 19, wherein information about process of generation of the source data S-D and/or the confirmation data C-D are received for storage in the immutable database.

21. The method according to claim 19, wherein information about process of generation of the source data S-D and/or the confirmation data C-D are received for storage outside the immutable database.

22. The method according to claim 14, wherein the source data S-D is not equal to the source event data S-ED and/or the confirmation data C-D is not equal the confirmation event data C-ED, while the source event data S-ED and/or the confirmation event data C-ED corresponding to the source data S-D and/or the confirmation data C-D are received for storage in the immutable database.

23. The method according to claim 14, further comprising sending the confirmation of storing the source-data S-D and/or the confirmation data C-D, optionally with corresponding timestamps of the source-data S-D and/or the confirmation data C-D and the hash code HC.

24. The method according to claim 14, wherein the immutable database is a blockchain.

25. A computer program product embodied on a non-transitory computer readable memory comprising instructions which, when executed by a computer, causes the computer to perform the method according to claim 14.

26. A system for providing time certification of the digital representation of an actual event bound with the real time of the occurrence of said actual event comprising:

at least one memory comprising an immutable database, at least one processor, a communication device, said communication device being configured to receive and store a source data S-D being the representation of a source event data S-ED of an actual source event SE that is to be digitally documented, said immutable database being configured to perform real time timestamping of the source data S-D with the timestamp acquired from a trusted source, said immutable database being further configured to store said source data S-D and to store the timestamp of the source data S-D, said at least one processor being configured to determine data describing a state of said immutable database at a particular time indicated by the timestamp acquired when timestamping the source data S-D, and configured to calculate a hash code HC using a hash function having as input at least: the data describing the state of the immutable database, the source data (S-D), and the timestamp of the source data (S-D), the communication device being further configured to send the representation of the hash code HC and to receive a confirmation event data C-ED of a confirmation event CE, the confirmation event CE being the source event SE comprising additionally physically incorporated representation of the hash code HC into its realm, and said immutable database being further configured to store a confirmation data C-D, being a representation of the confirmation event data C-ED, and to perform real time timestamping of the confirmation data C-D with the real time timestamp acquired from a trusted time source.

27. The system according to claim 26, wherein said at least one processor is further configured to calculate a confirmation hash code CHC using a hash function having on its input at least the confirmation data C-D, the timestamp of the confirmation data C-D, and the hash code HC, wherein said communication device is further configured to send the confirmation hash code CHC.

28. The system according to claim 26, wherein said immutable database is configured to store the confirmation hash code CHC.

29. A method of binding a digital representation of an actual event with the real time of the occurrence of the actual event comprising following steps performed in real time:

acquiring, using at least one of a camera or a microphone, a source event data S-ED of an actual source event SE, and sending a representation of the source event data S-ED to an immutable database for storing and real-time timestamping, calculating a hash code HC using hash functions having on the input at least:

a data describing a state of the immutable database, the source data S-D being a representation of the source event data S-ED, and the real time timestamp of the source data S-D acquired at time of reception of the source data S-D by the immutable database, converting the hash code HC to a representation of a hash code HC according to a predetermined conversion method and storing the predetermined conversion method used to perform the conversion, presenting a representation of the hash code HC in real time so to incorporate said representation into the realm of the source event SE, in order to create a confirmation event CE that binds the source event SE and the hash code HC, the confirmation event CE being a source event SE with physically present representation of the hash code HC, acquiring a confirmation event data C-ED of the confirmation event CE and sending the confirmation data C-D being a representation of the confirmation event data C-ED, to the immutable database for storing and instant timestamping so as to provide a confirmation of incorporation of the hash code HC into the source event SE, the confirmation event CE being a modified actual source event SE.

\* \* \* \* \*